(12) United States Patent
Akiyama et al.

(10) Patent No.: US 8,159,645 B2
(45) Date of Patent: Apr. 17, 2012

(54) DISPLAY PANEL SUBSTRATE, A DISPLAY PANEL HAVING THE SUBSTRATE, A METHOD OF PRODUCING THE SUBSTRATE, AND A METHOD OF PRODUCING THE DISPLAY PANEL

(75) Inventors: Hiroto Akiyama, Tsu (JP); Masahiro Matsuda, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 431 days.

(21) Appl. No.: 12/441,469

(22) PCT Filed: Sep. 7, 2007

(86) PCT No.: PCT/JP2007/067475
§ 371 (c)(1), (2), (4) Date: Jul. 23, 2009

(87) PCT Pub. No.: WO2008/032647
PCT Pub. Date: Mar. 20, 2008

(65) Prior Publication Data
US 2010/0033666 A1   Feb. 11, 2010

(30) Foreign Application Priority Data
Sep. 16, 2006  (JP) ................................. 2006-251960

(51) Int. Cl.
*G02F 1/1345* (2006.01)
(52) U.S. Cl. ........................................ 349/149; 349/152
(58) Field of Classification Search ........... 349/149–152
See application file for complete search history.

(56) References Cited

U.S. PATENT DOCUMENTS

| 8,004,480 B2 * | 8/2011 | Kim et al. ................ 345/82 |
| 2003/0086048 A1 | 5/2003 | Ukita |
| 2003/0095225 A1 | 5/2003 | Hsu et al. |
| 2003/0227078 A1 | 12/2003 | Chang |
| 2006/0012729 A1 | 1/2006 | Tanaka et al. |
| 2006/0123293 A1 | 6/2006 | Kim et al. |

FOREIGN PATENT DOCUMENTS

| JP | 62-38423 A | 2/1987 |
| JP | 62-297820 A | 12/1987 |
| JP | 2005-115129 | 4/2005 |
| JP | 2006-030627 A | 2/2006 |

OTHER PUBLICATIONS

International Search Report for PCT/JP2007/067475, mailed Oct. 2, 2007.

* cited by examiner

*Primary Examiner* — Dung T. Nguyen
(74) *Attorney, Agent, or Firm* — Nixon & Vanderhye P.C.

(57) ABSTRACT

A display panel substrate in which parasitic capacitances are provided to data signal lines and any short which occurs between the data signal line and a conductor film can be corrected, and a display panel having the substrate. A plurality of strip conductors 1262 overlap with drawing lines 121 arranged to transmit data signals to data signal lines 111 with an insulating film 132 sandwiched therebetween, and the plurality of strip conductors 1262 are electrically connected by connecting portions 1263, 1264 and 1265 having portions which do not overlap with the drawing lines.

10 Claims, 18 Drawing Sheets

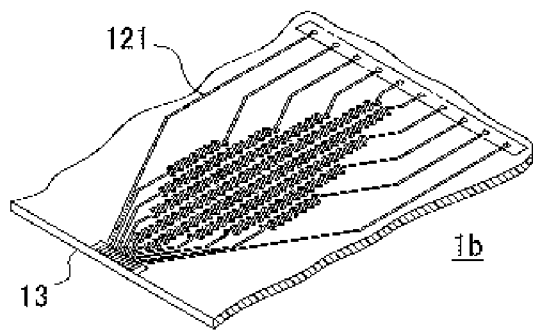
FIG. 5A
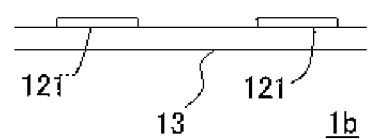
FIG. 5B
FIG. 5C
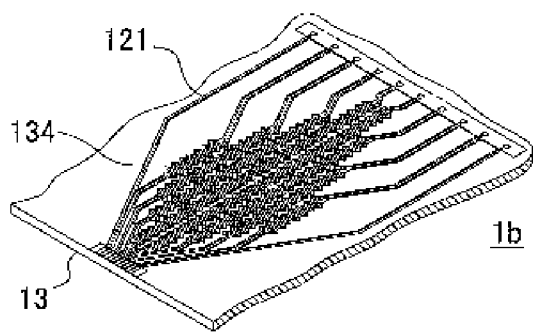
FIG. 5D
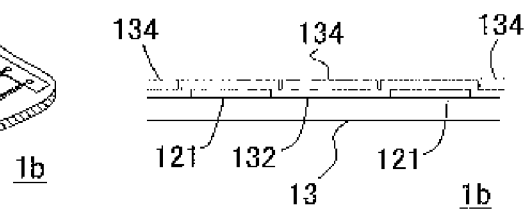
FIG. 5E
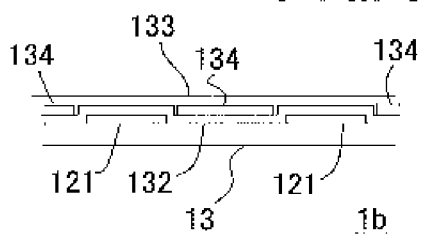
FIG. 5F
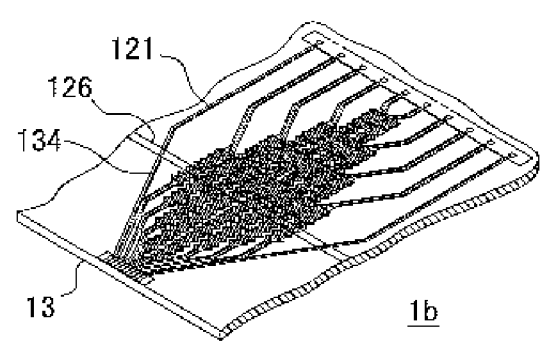
FIG. 5G
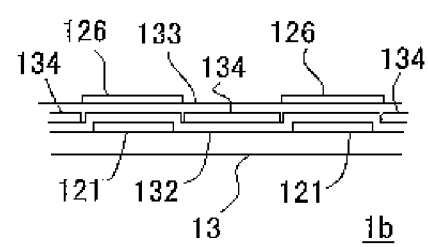
FIG. 5H

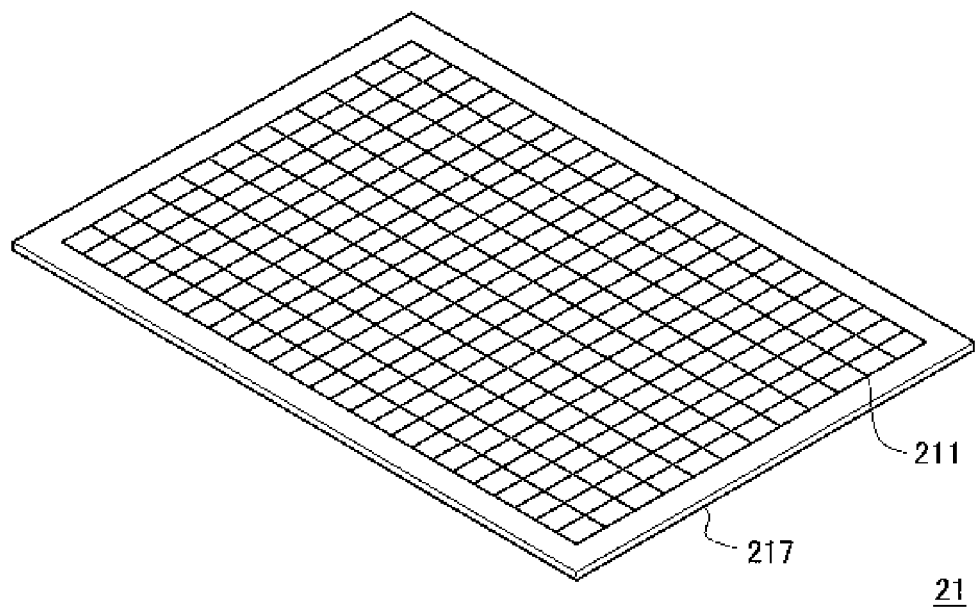
FIG. 17A
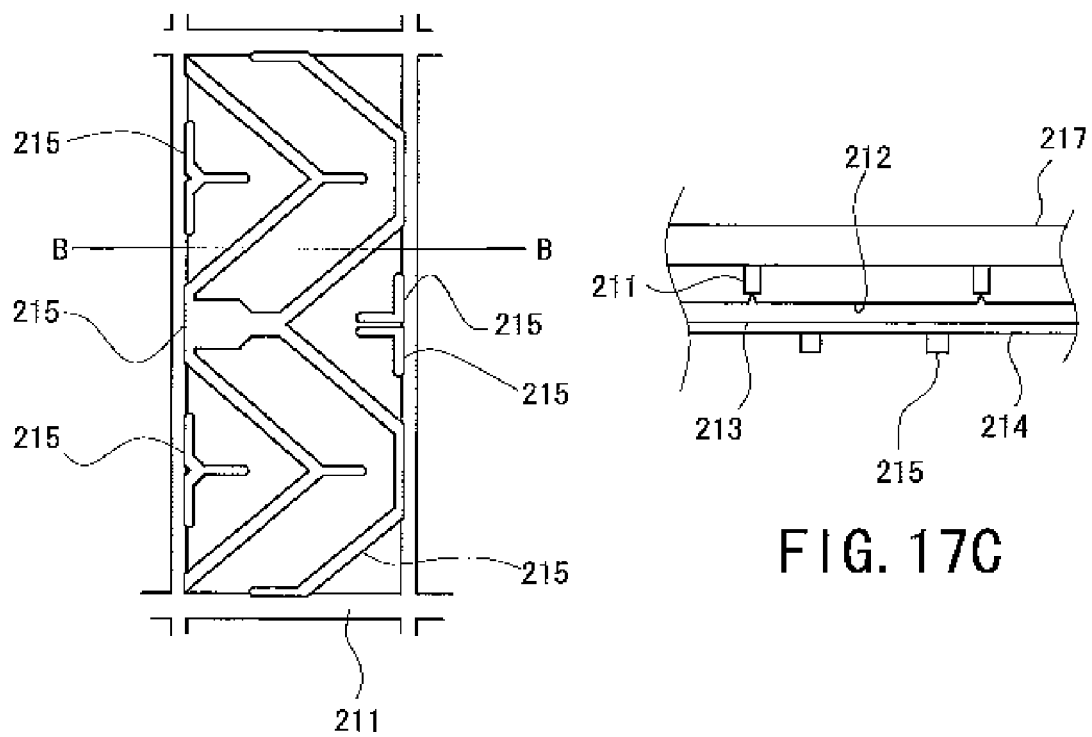
FIG. 17B
FIG. 17C

DISPLAY PANEL SUBSTRATE, A DISPLAY PANEL HAVING THE SUBSTRATE, A METHOD OF PRODUCING THE SUBSTRATE, AND A METHOD OF PRODUCING THE DISPLAY PANEL

This application is the U.S. national phase of International Application No. PCT/JP2007/067475, filed 7 Sep. 2007, which designated the U.S. and claims priority to Japan Application No. 2006-251960, filed 16 Sep. 2006, the entire contents of each of which are hereby incorporated by reference.

BACKGROUND OF THE INVENTION

1. Field of the Invention

The present invention relates to a display panel substrate, a display panel having the substrate, and a method of correcting the display panel. More specifically, the present invention relates to a display panel substrate having a layer structure of a conductor film, a semiconductor film, and an insulating film of given patterns, e.g., a liquid crystal display panel substrate, a display panel having the substrate, and a method for correcting the display panel.

2. Description of the Related Art

A generally used active matrix type liquid crystal display panel is configured such that a TFT array substrate and a common substrate are placed opposed to each other having a minute gap therebetween, and liquid crystals are filled between the substrates.

FIG. 18 is a schematic plan view of an example of a conventional configuration of a TFT array substrate. On one side of a TFT array substrate 9, an active region 91 is provided. The active region 91 has a matrix arrangement of a plurality of pixel electrodes (not shown) and switching elements (not shown) arranged to drive the respective pixel electrodes. The active region 91 is provided with a plurality of data signal lines 911 arranged to drive the switching elements and a plurality of gate signal lines 912.

In a region outside of the active region 91, drawing lines 921 arranged to transmit source signals to the respective data signal lines 911 are provided. One end of each of the drawing lines 921 is electrically connected to the respective data signal line 911 at the edge of the active region 91, and the other end of the drawing line 921 is connected to a land which is provided at the edge of the TFT array substrate 9.

If electric resistances of the drawing lines are different to one another or capacitances generated between the drawing lines and other conductors in the vicinities thereof (e.g., capacitances generated between the adjacent drawing lines, capacitances generated between the drawing lines and conductor films which overlap with the drawing lines with insulating films sandwiched therebetween; hereinafter referred to as parasitic capacitances) are different to one another, the forms of delay of source signals to be transmitted to the data signal lines could be different among the drawing lines. If the forms of delay of source signals are different among the data signal lines, display irregularity could occur in an image displayed on a display panel. Therefore, it is preferable that the electric resistances and the parasitic capacitances are made uniform among the drawing lines.

The drawing lines are generally configured such that bundles each having a given number of drawing lines converge from the edge of the active region to the edge of the TFT array substrate. To be specific, the drawing lines are divided into bundles each having a given number of drawing lines, and each of the bundles of the drawing lines converges from the edge of the active region to the edge of the TFT array substrate and thus has a taper shape. Therefore, the drawing lines in each bundle are configured such that the length of the drawing line in the center of the bundle is shorter, and the length of the drawing line farther from the center of the bundle is longer. Thus, the lengths of the drawing lines in each bundle are different to one another.

The electric resistances and the parasitic capacitances of the drawing lines could be different according to the lengths of the drawing lines. Therefore, display conditions of pixel groups which receive source signals through the drawing lines of different lengths (and data signal lines connected to the drawing lines) could be different among one another.

Because the lengths of the drawing lines in each bundle gradually differ from the center to either side of the bundle, the electric resistances and the parasitic capacitances also gradually differ from the center to either side of the bundle. Accordingly, the display conditions could gradually differ from the pixel group which receives source signals through the drawing line at the center of the bundle (and the data signal line connected to the drawing line) toward the pixel group which receives source signals through the drawing line on either side of the bundle (and the data signal line connected to the drawing line). Because such a bundle of drawing lines is provided in a plurality, there is a possibility that a plurality of gradual differences in display could occur as a whole in the image displayed on the display panel, and display irregularity in the form of longitudinal streaks could occur on the display panel.

Such display irregularity easily occurs due to the recent increase in the size of the display panel. To be specific, the lengths of the data signal lines are increased by the increase in the size of the display panel, and the electric resistances and the parasitic capacitances of the data signal lines are accordingly increased. Thus, larger loads are put on source drivers, thereby easily causing delay of source signals. Thus, an influence of the differences in the electric resistances and the parasitic capacitances among the drawing lines is easily exerted on the display conditions.

In order to prevent the occurrence of display irregularity, loads on the source drivers are to be reduced. For example, a pair of source drivers are used to transmit source signals from the both ends of each of the data signal lines. However, this configuration increases the number of components and the number of processes as compared to the configuration of inputting source signals from one end of each of the data signal lines. Accordingly, the production cost and the product price could be increased.

Alternatively, the lengths of the drawing lines are made uniform in order to make the electric resistances uniform. In addition, the drawing lines are provided with parasitic capacitances in order to make display uniform (see Japanese Patent Application Unexamined Publication No. 2006-106676). In this configuration, a conductor film is formed on the drawing lines with an insulating film sandwiched therebetween in order to provide parasitic capacitances between the drawing lines and the conductor film.

However, this configuration has a problem as described below. For example, if a conductive foreign particle adheres to the surface of a TFT array substrate in a step of producing a substrate, the foreign particle could pass through the insulating film provided between the drawing line and the conductor film and electrically develop a short between the drawing line and the conductor film. If the drawing line and the conductor film are shorted, given source signals cannot be transmitted to the data signal line connected to the drawing line. As a result, a streak display defect occurs along the data signal line. It is difficult for the configuration of Japanese Patent Application Unexamined Publication No. 2006-106676 to correct such a display defect.

SUMMARY OF THE INVENTION

An object of the invention is to overcome the problems described above and to provide a display panel substrate in which parasitic capacitances are provided to data signal lines and any short which occurs between the data signal line and a conductor film can be corrected, a display panel having the substrate, and a method of correcting the display panel. Another object of the invention is to provide a display panel substrate in which any short which occurs between a data drawing line and a conductor film can be corrected without exerting an influence on parasitic capacitances of data drawing lines or minimizing such an influence if any, a display panel having the substrate, and a method of correcting the display panel.

In order to overcome the problems described above, preferred embodiments of the present invention provide a display panel substrate in which a plurality of strip conductors overlap with drawing lines arranged to transmit data signals to data signal lines with an insulating film sandwiched therebetween. The plurality of strip conductors are electrically connected to one another by connecting portions.

The connecting portions preferably have portions which do not overlap with the drawing lines in order that the connecting portions can be cut by projecting light energy (e.g., a laser beam) thereto from the outside of a display panel.

For example, when the drawing lines have zigzag portions, the strip conductors overlap with the zigzag portions with the insulating film sandwiched therebetween. By making the connecting portions arranged to connect the strip conductors intersect with the zigzag portions of the drawing lines, the connecting portions are provided with portions which do not overlap with the drawing lines.

The configuration of connecting the strip conductors to one another is preferably as follows. First, longitudinally adjacent ones of the plurality of strip conductors which overlap with the drawing lines with the insulating film sandwiched therebetween are electrically connected by the connecting portions. In addition, laterally adjacent ones of the plurality of strip conductors which overlap with one of the drawing line with the insulating film sandwiched therebetween and the plurality of strip conductors which overlap with another one of the drawing lines adjacent to said one of the drawing lines are electrically connected by the connecting portions. As a result, the strip conductors are electrically connected in a matrix arrangement.

The following configuration is also preferable. First, longitudinally adjacent ones of the plurality of strip conductors which overlap with the drawing lines with the insulating film sandwiched therebetween are electrically connected by the connecting portions. Then, laterally adjacent ones of the connecting portions arranged to connect the plurality of strip conductors which overlap with one of the drawing lines with the insulating film sandwiched therebetween and the connecting portions arranged to connect the plurality of strip conductors which overlap with another one of the drawing lines adjacent to said one of the drawing lines with the insulating film sandwiched therebetween are further connected by other connecting portions. Thus, the strip conductors are electrically connected in a matrix arrangement.

The following configuration is also preferable. Longitudinally adjacent ones of the plurality of strip conductors which overlap with the drawing lines with the insulating film sandwiched therebetween are electrically connected by the connecting portions. As a result, the plurality of strip conductors which overlap with the drawing lines with the insulating film sandwiched therebetween are electrically connected linearly.

The strip conductors and the connecting portions arranged to electrically connect the strip conductors may be made of the same material as pixel electrodes.

Light shielding films may be provided between the drawing lines. In this configuration, the connecting portions may have portions which do not overlap with any of the drawing lines and the light shielding films in order that the connecting portion can be cut by projecting a laser beam thereto from the outside of the display panel substrate.

Then, a display panel is produced by using the display panel substrate as described above and a common substrate. In the display panel, the strip conductors of the display panel substrate are preferably electrically connected to a common electrode or a common potential line of the common substrate.

According to the preferred embodiments of the present invention, if a short occurs between the drawing line arranged to transmit data signals to the data signal line and the strip conductor which overlaps with the drawing line with the insulating film sandwiched therebetween, the shorted strip conductor can be electrically disconnected from the adjacent strip conductors by cutting the connecting portions connected to the shorted strip conductor. As a result, a display defect caused by the short can be easily corrected.

If the connecting portions have portions which do not overlap with the drawing lines, it is possible to cut the connecting portion by projecting a laser beam thereto from the outside through the unoverlapping portions. In addition, if the connecting portions have portions which do not overlap with any of the drawing lines and the light shielding film in the configuration of forming the light shielding films between the drawing lines, it is possible to cut the connecting portion by projecting a laser beam thereto from the outside through the unoverlapping portions. Thus, correction can be easily made.

BRIEF DESCRIPTION OF THE DRAWINGS

FIG. 3A is a perspective view showing a step of forming data drawing lines and FIG. 3B is a cross-sectional view in the step shown in FIG. 3A. FIG. 3C is a cross-sectional view showing a step of forming an insulating film. FIG. 3D is a perspective view showing a step of forming a conductor layer and FIG. 3E is a sectional view in the step shown in FIG. 3D.

FIGS. 5A to 5H are perspective views and cross-sectional views schematically showing steps of forming line bundles, a conductor layer, and other constituent elements of the display panel substrate according to the second preferred embodiment of the present invention. FIG. 5A is a perspective view showing a step of forming data drawing lines and FIG. 5B is a cross-sectional view thereof. FIG. 5C is a sectional view showing a step of forming a first insulating film. FIG. 5D is a perspective view showing a step of forming light shielding films and FIG. 5E is a cross-sectional view thereof. FIG. 5F is a cross-sectional view showing a step of forming a second insulating film. FIG. 5G is a perspective view showing a step of forming a conductor layer and FIG. 5H is a cross-sectional view thereof.

In FIG. 10, the cross-sectional structure in a panel frame region is specifically shown.

FIGS. 17A to 17C are schematic views of the configuration of a color filter (common substrate). FIG. 17A is a perspective view schematically showing the overall structure of the color filter. FIG. 17B is a plan view showing the configuration of one pixel in the color filter. FIG. 17C is a cross-sectional view along the line B-B in FIG. 17B showing the cross sectional structure of the pixel.

DETAILED DESCRIPTION OF PREFERRED EMBODIMENTS

A detailed description of preferred embodiments of the present invention will now be provided with reference to the accompanying drawings.

Figure 1:
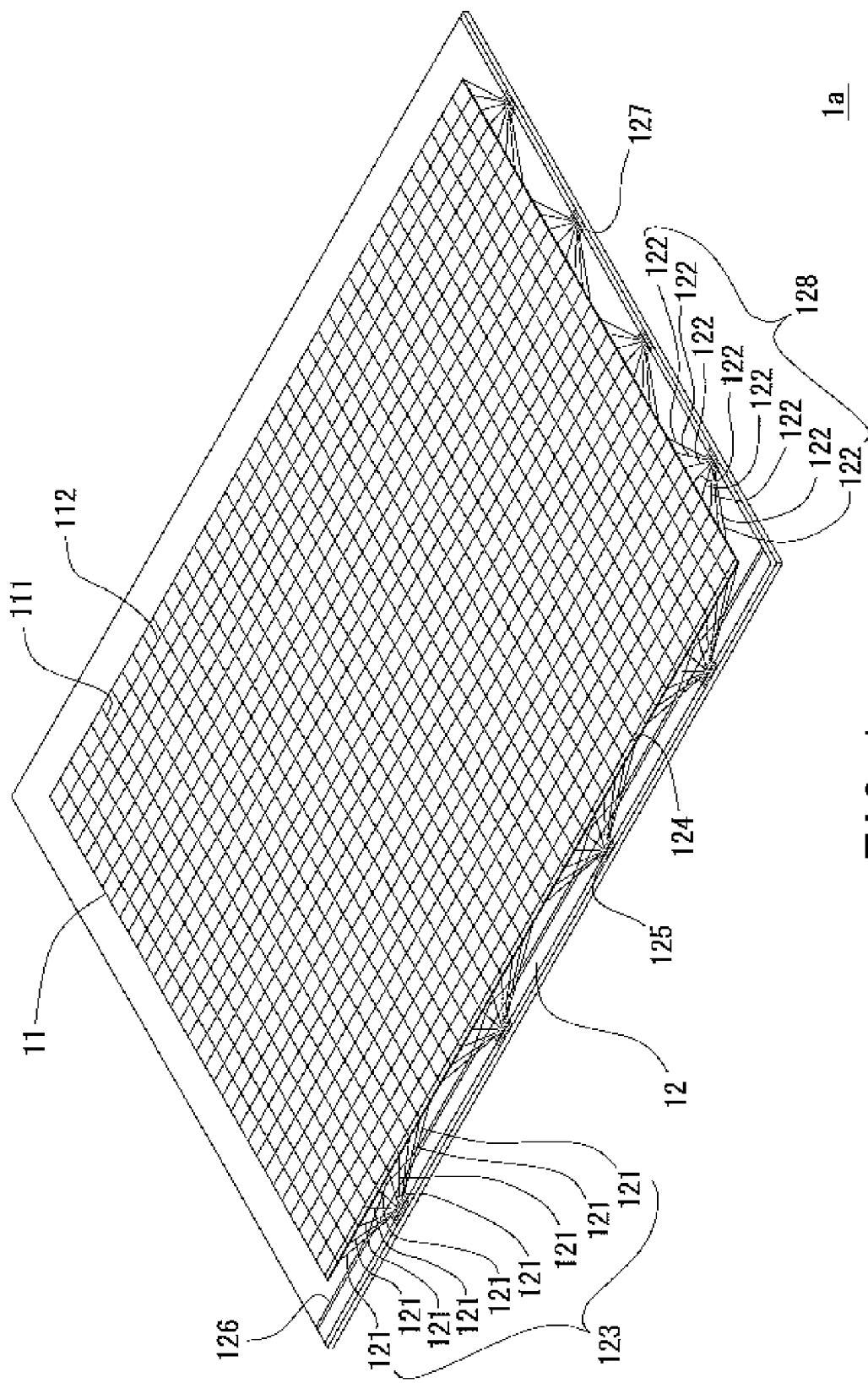
FIG. 1 is an exploded perspective view schematically showing the overall configuration of a display panel substrate according to a first preferred embodiment of the present invention.

FIG. 1 is an exploded perspective view schematically showing the overall configuration of a display panel substrate according to a first preferred embodiment of the present invention. A brief description of the overall configuration of a display panel substrate 1a according to the first preferred embodiment of the present invention is provided with reference to FIG. 1.

As shown in FIG. 1, an active region 11 is provided to the display panel substrate 1a according to the first preferred embodiment of the present invention. The active region 11 has a matrix arrangement of a plurality of pixel electrodes (not shown) and switching elements (not shown; e.g., thin film transistors) arranged to drive the respective pixel electrodes. In addition, the active region 11 is provided with a plurality of data signal lines 111 arranged to transmit data signals to source electrodes of the switching elements (also called "source signal lines" or "source bus lines"), and a plurality of scanning signal lines 112 arranged to transmit scanning signals to gate electrodes of the switching elements (also called "gate signal lines" or "gate bus lines"). The data signal lines 111 are placed substantially parallel to one another, and the scanning signal lines 112 are placed substantially parallel to one another and substantially perpendicular to the data signal lines 111.

In a region outside of the active region 11 (hereinafter referred to as "panel frame region 12"), lines 121 which are drawn from the respective data signal lines 111 (hereinafter referred to as "data drawing lines") and lines 122 which are drawn from the respective scanning signal lines 112 are provided.

One ends of the data drawing lines 121 are located in contact portions 124 at the edge of the active region 11 and are electrically connected to the respective data signal lines 111 in the contact portions 124. The other ends of the data drawing lines 121 are located in terminal portions 125 at the edge of the display panel substrate 1a and are electrically connected to lands for connecting TAB (Tape Automated Bonding) (not shown) on which source drivers are provided (e.g., the other ends define lands). Each of the data drawing lines 121 defines a signal path through which data signals generated by the source drivers are transmitted to the respective data signal line 111.

In general, the data drawing lines 121 are divided into bundles 123 each having a given number of data drawing lines 121. The bundles 123 are arranged at given intervals in the panel frame region 12 of the display panel substrate 1a along the outer edge of the display panel substrate 1a. The data drawing lines 121 in each of the bundles 123 converge from the contact portion 124 toward the terminal portion 125. Thus, each of the bundles 123 has a taper shape tapering from the contact portion 124 toward the terminal portion 125.

In the panel frame region 12, an insulating film (not shown) is formed on the data drawing lines 121. A conductor layer 126 arranged to provide given parasitic capacitances to the data drawing lines 121 is formed on the insulating film. Each of the data drawing lines 121 has portions which overlap with the conductor layer 126 with the insulating film sandwiched therebetween. Therefore, capacitances are generated between the data drawing lines 121 and the conductor layer 126, and accordingly the data drawing lines 121 have given parasitic capacitances.

One ends of the lines 122 drawn from the scanning signal lines 112 are electrically connected to the respective scanning signal lines 112 at the edge of the active region 11. The other ends of the lines 122 are located in terminal portions 127 at the edge of the display panel substrate 1a and are electrically connected to lands for connecting TAB (Tape Automated Bonding) (not shown) on which gate drivers are provided in the terminal portions 127. Each of the lines 122 drawn from the scanning signal lines 112 defines a signal path through which scanning signals generated by the gate drivers are transmitted to the respective scanning signal lines 112. The lines 122 drawn from the scanning signal lines 112 are prepared integrally with the scanning signal lines 112 and the lands in the terminal portions 127 from an identical material.

The lines 122 drawn from the scanning signal lines 112 are also divided into bundles 128 each having a given number of lines 122. The bundles 128 of the lines 122 drawn from the scanning signal lines 112 are arranged at given intervals in the panel frame region 12 of the display panel substrate 1a along the outer edge of the display panel substrate 1a. The lines 122 drawn from the scanning signal lines 112 in each of the bundles 128 converge from the edge of the active region 11 toward the terminal portion 127. Thus, each of the bundles 128 of the lines 122 drawn from the scanning signal lines 112 has a taper shape tapering from the edge of the active region 11 toward the terminal portion 127.

Figure 2:
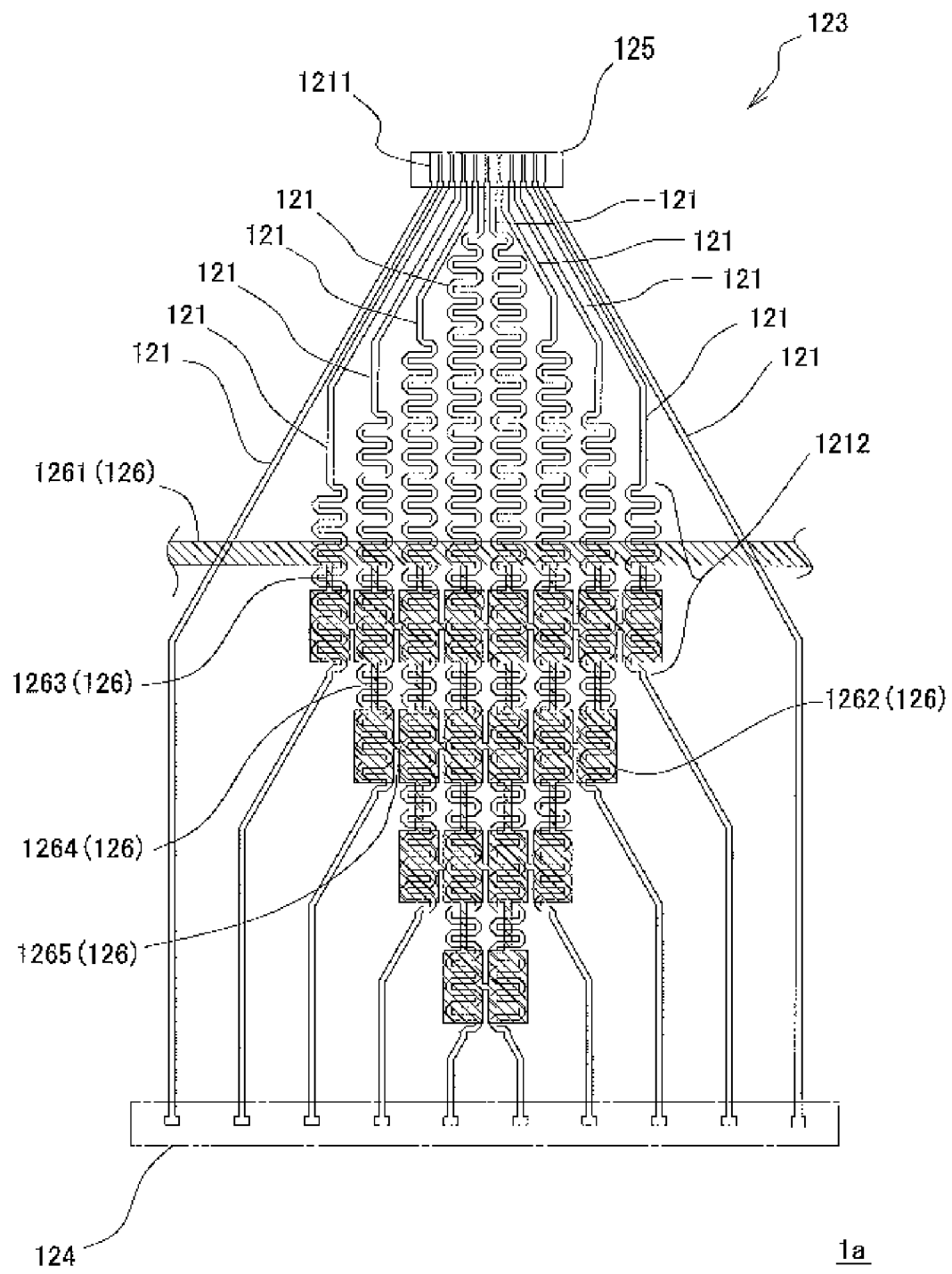
FIG. 2 is a schematic plan view showing the configuration of a bundle of data drawing lines and the configuration of a conductor layer for providing given parasitic capacitances to the data drawing lines.

FIG. 2 is a plan view schematically showing the configuration of the bundle 123 of the data drawing lines 121 and the configuration of the conductor layer 126 for providing given parasitic capacitances to the data drawing lines 121. FIG. 2 is given only for the purpose of illustration, and actual sizes of the bundles 123 of the data drawing lines 121 and the conductor layer 126 are not precisely shown. In the following descriptions, the term "line bundle" refers to "bundle of data drawing lines" if not otherwise specified.

As shown in FIG. 2, one line bundle 123 includes a given number of data drawing lines 121. One end of each of the data drawing lines 121 is located in the contact portion 124 and is electrically connected to the respective data signal lines 111 via a through hole or other constituent elements in the contact portion 124. The other end of the data drawing line 121 is located in the terminal portion 125 and defines a land 1211 for connecting TAB (not shown) on which source drivers are provided in the terminal portion 125. The data drawing lines 121 and the land 1211 are integrally prepared from an identical conductor film.

The data drawing lines 121 in the line bundle 123 gradually converge from the contact portion 124 to the terminal portion 125 (i.e., from the edge of the active region 11 toward the edge of the display panel substrate 1a). Accordingly, the line bundle 123 as a whole has a taper shape tapering from the contact portion 124 to the terminal portion 125.

The data drawing lines 121 in one line bundle 123 have substantially equal lengths. The linear distance between one end and the other end of the data drawing line 121 in the center of the line bundle 123 is shorter, and the linear distance between one end and the other end of the data drawing line 121 farther from the center of the line bundle 123 is longer. Therefore, in order to prevent difference in electric resistances of the data drawing lines 121 due to the difference in their lengths, given ones of the data drawing lines 121 are provided with zigzag portions 1212 in given ranges at some midpoints of the data drawing lines 121.

To be specific, the zigzag portion 1212 of the data drawing line 121 in the center of the line bundle 123 is longer, and the zigzag portion 1212 of the data drawing line 121 farther from the center of the line bundle 123 is shorter. The data drawing lines 121 farthest from the center of the line bundle 123 may not be provided with zigzag portions. Accordingly, the lengths of the data drawing lines 121 can be made uniform, which can make the electric resistances uniform.

An insulating film (not shown) is formed on the line bundle 123. The conductor layer 126 for providing given parasitic capacitances to the data drawing lines 121 is formed on the insulating film. In other words, the conductor layer 126 overlaps with the data drawing lines 121 with the insulating film sandwiched therebetween. Accordingly, capacitances are generated between the data drawing lines 121 and the conductor layer 126 depending on the dielectric constant of the insulating film and the area of the overlap between each of the data drawing lines 121 and the conductor layer 126.

The conductor layer 126 has a linear portion 1261 (hereinafter referred to as "linear conductor"), strip portions 1262 (hereinafter referred to as "strip conductors"), and connecting portions 1263, 1264 and 1265 arranged to connect the strip portions 1262 to one another or to connect the linear portion 1261 and the strip portions 1262.

As shown in FIG. 2, the zigzag portion 1212 of each of the data drawing lines 121 overlaps with one or more strip conductors 1262 with the insulating film sandwiched therebetween. The number of strip conductors 1262 which overlap with one data drawing line 121 is set to be larger in the center of the line bundle 123 and smaller in farther positions from the center of the line bundle 123. In FIG. 2, the data drawing lines 121 farthest from the center of the line bundle 123 do not overlap with the strip conductors 1262.

By such a configuration, the parasitic capacitances of the data drawing lines 121 can be made uniform. The capacitances generated between the data drawing lines 121 and the capacitances generated between the data drawing lines 121 and other conductors in the vicinities thereof are increased by increasing the lengths of the data drawing lines 121. Thus, the parasitic capacitances of the data drawing lines 121 are larger in farther positions from the center of the line bundle 123.

In the data drawing line 121 in the center of the line bundle 123, the capacitances generated between the data drawing line 121 and the conductor layer 126 is increased by increasing the area of the overlap between the data drawing line 121 and the conductor layer 126, i.e., by increasing the number of strip conductors 1262 which overlap with the data drawing line 121. As a result, the total amount of the parasitic capacitances of each of the data drawing lines 121 (i.e., the capacitances generated between the data drawing lines 121, the capacitances generated between the data drawing lines 121 and the strip conductors 1262 and other conductors) can be made uniform.

By using the connecting portions 1263, 1264 and 1265 of the conductor layer 126, the strip conductors 1262 are electrically connected to one another and the linear conductor 1261 and the strip conductors 1262 are electrically connected.

To be specific, the linear conductor 1261 and the strip conductors 1262 adjacent to the linear conductor 1261 are electrically connected by the connecting portions 1263. The connecting portions 1263 are hereinafter referred to as "first connecting portions" for the purpose of illustration.

Longitudinally adjacent ones of the plurality of strip conductors 1262 which overlap with one data drawing line 121 are connected to one another by the connecting portions 1264.

The connecting portions 1264 are hereinafter referred to as "second connecting portions" for the purpose of illustration. In other words, the plurality of strip conductors 1262 which overlap with one data drawing line 121 are electrically connected linearly by the second connecting portions 1264.

In addition, laterally adjacent ones of the strip conductors 1262 which overlap with one data drawing line 121 and the strip conductors 1262 which overlap with another data drawing line 121 adjacent to that data drawing line 121 are electrically connected to one another by the connecting portions 1265. The connecting portions 1265 are hereinafter referred to as "third connecting portions" for the purpose of illustration.

As a result, the strip conductors 1262 are electrically connected in a matrix arrangement and are electrically connected also to the linear conductor 1261. Thus, the strip conductors 1262 have equal or substantially equal potentials, and the strip conductors 1262 and the linear conductor 1261 have equal or substantially equal potentials.

The first, second and third connecting portions 1263, 1264 and 1265 each have a narrow linear shape. In addition, they at least have portions which do not overlap with any of the data drawing lines 121.

To be specific, each of the second connecting portions 1264 arranged to connect the strip conductors 1262 which overlap with one data drawing line 121 intersects with the data drawing line 121 in the zigzag portion 1212 of the data drawing line 121 (or passes across the data drawing line 121 a plurality of times). Accordingly, the second connecting portion 1264 has portions which overlap with the data drawing line 121 and portions which do not overlap with the data drawing line 121 alternately. The first connecting portions 1263 arranged to connect the linear conductor 1261 and the strip conductors 1262 have the same configuration as the configuration of the second connecting portions 1264.

The third connecting portions 1265 (i.e., connecting portions arranged to electrically connect the strip conductors 1262 which overlap with one data drawing line 121 and the strip conductors 1262 which overlap with another data drawing line 121 adjacent to that data drawing line 121) do not overlap with any of the data drawing lines 121 as shown in FIG. 2.

Figure 3A:
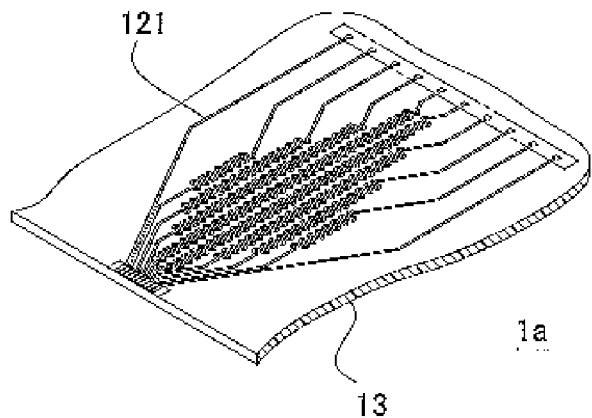
FIGS. 3A to 3E are perspective views and cross-sectional views schematically showing steps of forming line bundles and a conductor layer.
Figure 3B:
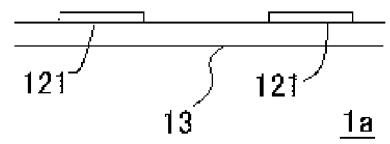
Figure 3C:
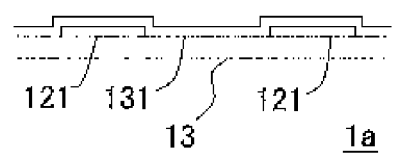
Figure 3D:
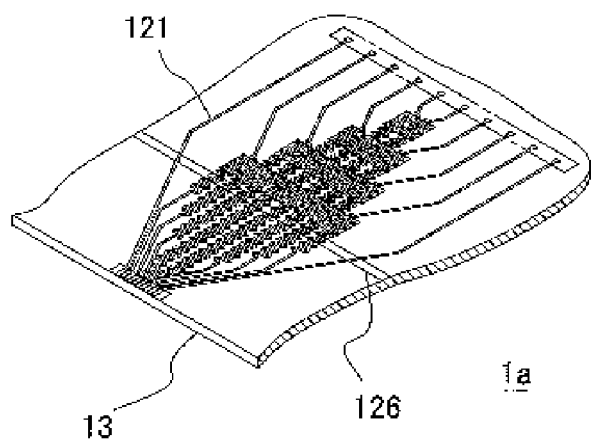
Figure 3E:
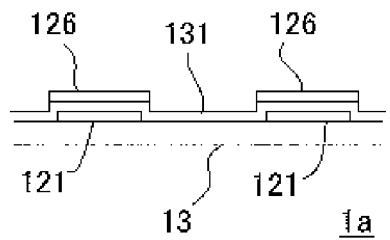

Next, descriptions of steps of forming line bundles 123 and a conductor layer 126 is given. FIGS. 3A to 3E are perspective views and cross-sectional views schematically showing the steps of forming the line bundles 123 and the conductor layer 126. FIG. 3A is a perspective view showing a step of forming the data drawing lines 121 and FIG. 3B is a cross-sectional view in the step shown in FIG. 3A. FIG. 3C is a cross-sectional view showing a step of forming the insulating film. FIG. 3D is a perspective view showing a step of forming the conductor layer and FIG. 3E is a sectional view in the step shown in FIG. 3D.

It should be noted that other steps for producing the display panel substrate are performed between and/or simultaneously with the steps to be described below; however, descriptions of other steps are omitted herein.

As shown in FIGS. 3A and 3B, the data signal lines 121 are formed on a transparent substrate 13. For example, a layer of a conductive material is formed on the transparent substrate 13, and the formed conductive material layer is subject to patterning preferably by photolithography so as to have a pattern of the data drawing lines 121.

An insulating film 131 is formed so as to cover the formed data drawing lines 121 as shown in FIG. 3C. Then, the conduction layer 126 (i.e., the strip conductors 1262, the linear conductor 1261, and the first, second and third connecting portions 1263, 1264 and 1265) is formed as shown in FIGS. 3D and 3E. For example, a layer of a conductive material is formed on the insulating film 131, and the formed conductive material layer is subjected to patterning preferably by photolithography so as to have patterns of the strip conductors 1262, the linear conductor 1261, and the first, second and third connecting portions 1263, 1264 and 1265.

As a result, capacitances are generated in portions at which the data drawing line 121 and the conductor layer 126 overlap with one another. The capacitances generated between the data drawing lines 121 and the conductor layer 126 are determined based on the dielectric constant of the insulating film 131 and the area of the overlap between each of the data drawing lines 121 and the conductor layer 126. Accordingly, the number of strip conductors 1262 which overlap with each of the data drawing lines 121 and the area of each of the strip conductors 1262 are determined such that the parasitic capacitances of all of the data drawing lines 121 of the display panel substrate 1a may be equal or substantially equal.

Next, a description of forming films made of a light shielding material in the panel frame region 12 is provided. In order to prevent a light leak in the panel frame region 12 of the display panel, films made of a light shielding material (hereinafter referred to as "light shielding films") may be formed in the panel frame region 12.

Figure 4:
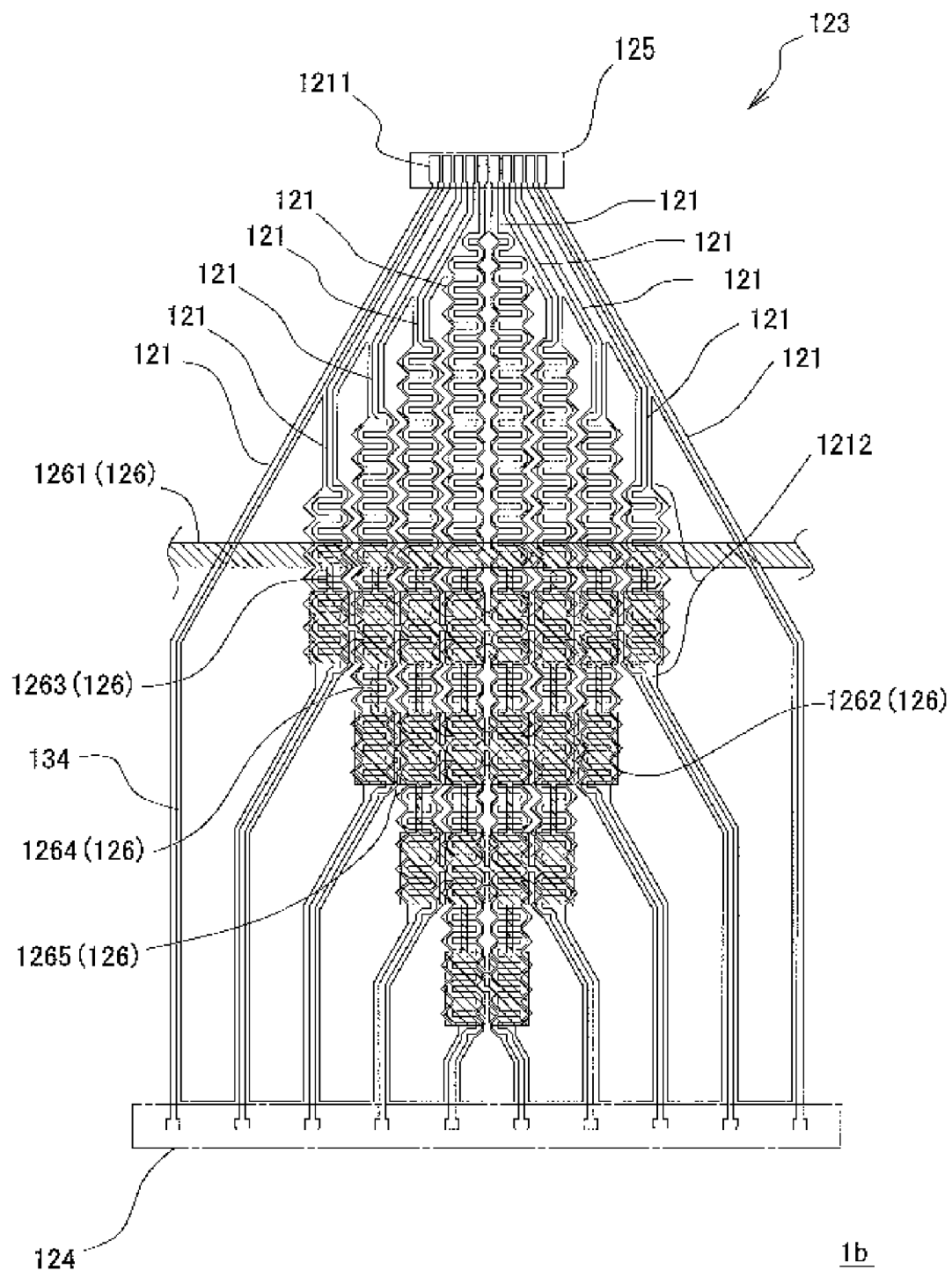
FIG. 4 is a plan view schematically showing the configuration of data drawing lines, a conductor layer, and light shielding films of a display panel substrate according to a second preferred embodiment of the present invention.

FIG. 4 is a plan view schematically showing the configuration of the data drawing lines 121, the conductor layer 126, and light shielding films 134 in a display panel substrate 1b according to a second preferred embodiment of the present invention, in which the light shielding films 134 are formed in the panel frame region 12.

As shown in FIG. 4, the light shielding films 134 are formed between the data drawing lines 121 in the panel frame region 12 of the display panel substrate 1b according to the second preferred embodiment of the present invention (although the light shielding films 134 are also formed outside of the line bundles 123, they are omitted from illustration in FIG. 4). The light shielding films 134 are not provided in portions which overlap with the third connecting portions 1265 (i.e., connecting portions arranged to electrically connect the strip conductors 1262 which overlap with one data drawing line 121 and the strip conductors 1262 which overlap with another data drawing line 121 adjacent to that data drawing line 121). Likewise, the light shielding films 134 are not provided in portions which overlap with the first connecting portions 1263 and the second connecting portions 1264. In other words, the first, second and third connecting portions 1263, 1264 and 1265 have portions which do not overlap with any of the data drawing lines 121 and the light shielding films 134.

The light shielding films 134 are preferably made of a conductor film which defines given lines other than the data drawing lines 121. For example, if the data drawing lines 121 and the scanning signal lines 112 in the active region 11 are made of an identical conductor, the light shielding films 134 and the data signal lines 111 are made of an identical conductor.

Next, descriptions of steps of forming the line bundles 123 and the conductor layer 126 in the case of including light shielding films 134 are given. FIGS. 5A to 5H are perspective views and cross-sectional views schematically showing the steps of forming the line bundles 123 and the conductor layer 126. FIGS. 5A and 5B, FIGS. 5D and 5E, and FIGS. 5G and 5H are perspective and cross-sectional views showing the same steps respectively. It should be noted that other steps for producing the display panel substrate 1b are performed between and/or simultaneously with the steps to be described below; however, descriptions of other steps are omitted herein.

First, as shown in FIGS. 5A and 5B, the data drawing lines 121 are formed on the transparent substrate 13. For example, a layer of a conductive material is formed on the transparent substrate 13, and the formed conductive material layer is subjected to patterning preferably by photolithography so as to have a pattern of the data drawing lines 121.

Subsequently, a first insulating film 132 is formed so as to cover the formed data drawing lines 121 as shown in FIG. 5C. Then, the light shielding films 134 are formed on the first insulating film 132 as shown in FIGS. 5D and 5E. For example, a layer of a light shielding material is formed on the first insulating film 132, and the formed light shielding material layer is subjected to patterning preferably by photolithography so as to have a pattern of the light shielding films 134.

Next, a second insulating film 133 is formed on the transparent substrate 13 having passed through the above described steps. After this step, the light shielding films 134 are covered by the second insulating film 133. Then, the strip conductors 1262, the linear conductor 1261, and the first, second and third connecting portions 1263, 1264 and 1265 are formed on the second insulating film 133 as shown in FIGS. 5G and 5H. For example, a layer of a conductive material is formed on the second insulating film 133, and the formed conductive material layer is subjected to patterning preferably by photolithography so as to have patterns of the strip conductors 1262, the linear conductor 1261, and the first, second and third connecting portions 1263, 1264 and 1265.

By such a configuration, it is possible to prevent or minimize a light leak in the panel frame region 12 and provide given parasitic capacitances to the data drawing lines 121. The same configuration as the display panel substrate 1a according to the first preferred embodiment of the present invention can be used except for including the light shielding films 134 and the second insulating film 133 covering the light shielding films 134.

The configuration for connecting the strip conductors 1262 to one another is not limited to that of the display panel substrate 1a or 1b according to the first or second preferred embodiment of the present invention. Descriptions of other configurations are provided below. In the following preferred embodiments of the present invention, constituent elements common to the first or second preferred embodiment of the present invention are assigned the same reference numerals as the first or second preferred embodiment of the present invention, and description thereof are omitted.

Figure 6:
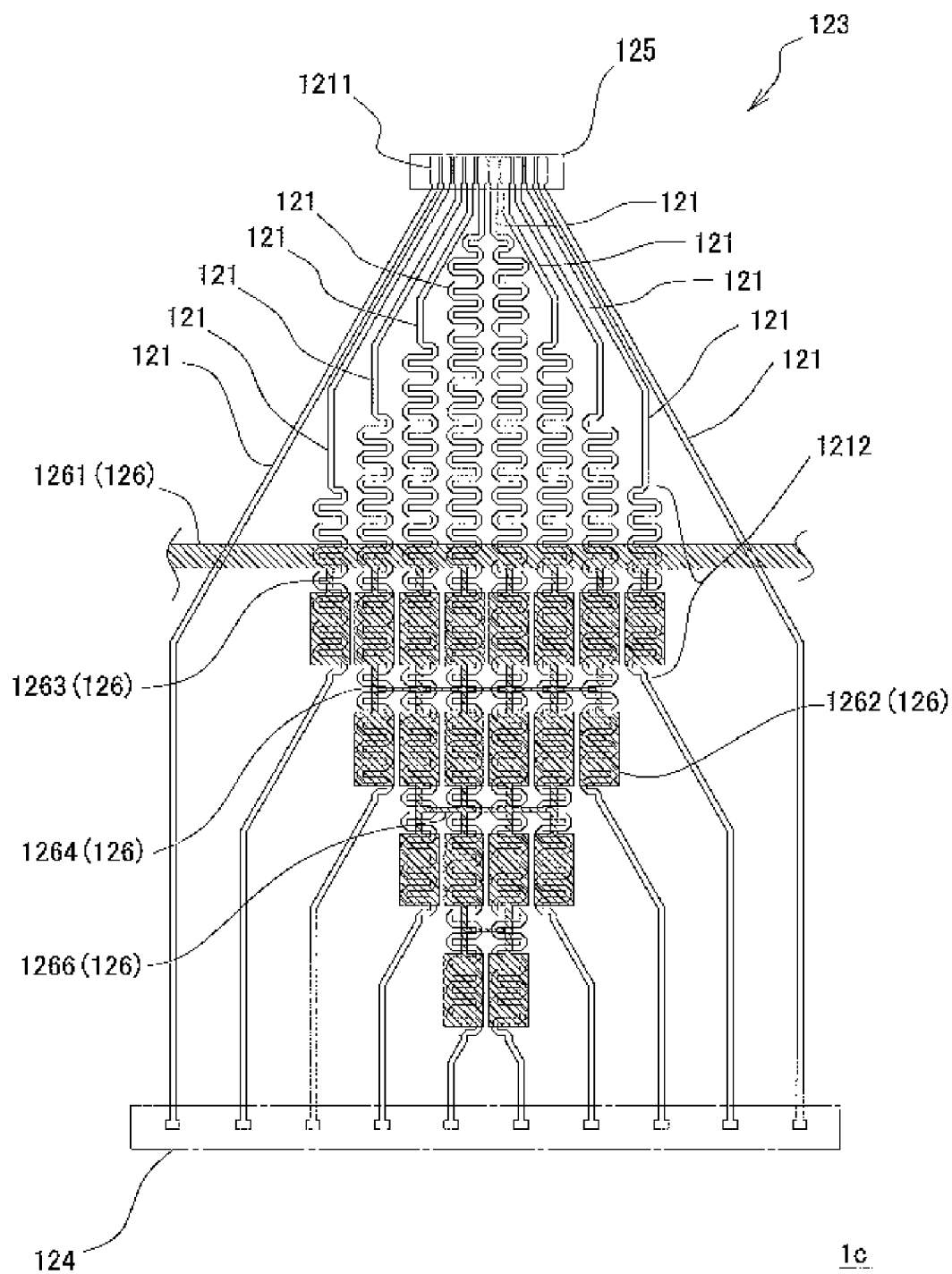
FIG. 6 is a plan view schematically showing the configuration of data drawing lines, strip conductors, a linear conductor, and connecting portions of a display panel substrate according to a third preferred embodiment of the present invention.

FIG. 6 is a plan view schematically showing the configuration of the data drawing lines 121, the strip conductors 1262, the linear conductor 1261, the connecting portions 1263 and 1264, and connecting portions 1266 of a display panel substrate 1c according to a third preferred embodiment of the present invention.

As shown in FIG. 6, the linear conductor 1261 and the strip conductors 1262 are electrically connected by the first connecting portions 1263, and the strip conductors 1262 are electrically connected to one another by the connecting portions 1264 and 1266.

To be specific, the linear conductor 1261 and each of the strip conductors 1262 adjacent to the linear conductor 1261 are electrically connected by the first connecting portion 1263. This configuration is the same as that of the display panel substrate according to the first or second preferred embodiment of the present invention. In addition, longitudinally adjacent ones of the plurality of strip conductors 1262 which overlap with one data drawing line 121 are connected to one another by the connecting portions 1264. This configuration is also the same as that of the display panel substrate according to the first or second preferred embodiment of the present invention.

In addition, laterally adjacent ones of the second connecting portions 1264 arranged to electrically connect the strip conductors 1262 which overlap with one data drawing line 121 and the second connecting portions 1264 arranged to electrically connect the strip conductors 1262 which overlap with another data drawing line 121 adjacent to that data drawing line 121 are further electrically connected to one another by the connecting portions 1266. The connecting portions 1266 arranged to electrically connect the second connecting portions 1264 to one another are hereinafter referred to as "fourth connecting portions" for the purpose of illustration.

The fourth connecting portions 1266 have portions which do not overlap with the data drawing lines 121. The third connecting portions 1265 according to the first preferred embodiment of the present invention are not provided in the third preferred embodiment of the present invention. Thus, the strip conductors 1262 which overlap with one data drawing line 121 and the strip conductors 1262 which overlap with the data drawing line 121 adjacent to that data drawing line 121 are not electrically connected directly.

As described above, the plurality of strip conductors 1262 which overlap with one data drawing line 121 are electrically connected linearly by the second connecting portions 1264. The strip conductors 1262 which overlap with adjacent data drawing lines 121 are electrically connected to one another by the fourth connecting portions 1266 arranged to connect the second connecting portions 1264. In addition, the linear conductor 1261 and the strip conductors 1262 adjacent to the linear conductor 1261 are electrically connected by the first connecting portions 1263. As a result, the strip conductors 1262 have equal or substantially equal potentials, and the strip conductors 1262 and the linear conductor 1261 have equal or substantially equal potentials.

The first, second and fourth connecting portions 1263, 1264 and 1266 each have a narrow linear shape. In addition, they at least have portions which do not overlap with any of the data drawing lines 121.

To be specific, the first connecting portions 1263 arranged to connect the linear conductor 1261 and the strip conductors 1262 and the second connecting portions 1264 arranged to connect the strip conductors 1262 which overlap with the data drawing lines 121 intersect with the data drawing lines 121 in the zigzag portions 1212 of the data drawing lines 121. Accordingly, the first and second connecting portion 1263 and 1264 have portions which overlap with the data drawing lines 121 and portions which do not overlap with the data drawing lines 121 alternately. Thus, the first and second connecting portion 1263 and 1264 have at least one portion which does not overlap with the data drawing lines 121.

The fourth connecting portions 1266 arranged to connect the second connecting portions 1264 also have portions which do not overlap with the data drawing lines 121 as shown in FIG. 6.

Each of the second connecting portions 1264 has at least one portion which does not overlap with the data drawing lines 121 in a position closer to at least one of the adjacent strip conductors 1262 with respect to the branching or intersecting position with the fourth connecting portion 1266. In FIG. 6, portions which do not overlap with the data drawing lines 121 are located in positions closer to each of the adjacent strip conductors 1262 with respect to the branching or intersecting position with the fourth connecting portion 1266.

A method of forming the data drawing lines 121, the conductor layer, and the other constituent elements of the display panel substrate 1c according to the third preferred embodiment of the present invention may be the same as that of the display panel substrate 1a according to the first preferred embodiment of the present invention. Thus, a description thereof is omitted. Only difference with respect to the display panel substrate 1a according to the first preferred embodiment of the present invention is found in the pattern of the conductor layer 126 in the step of forming a conductor layer 126.

Figure 7:
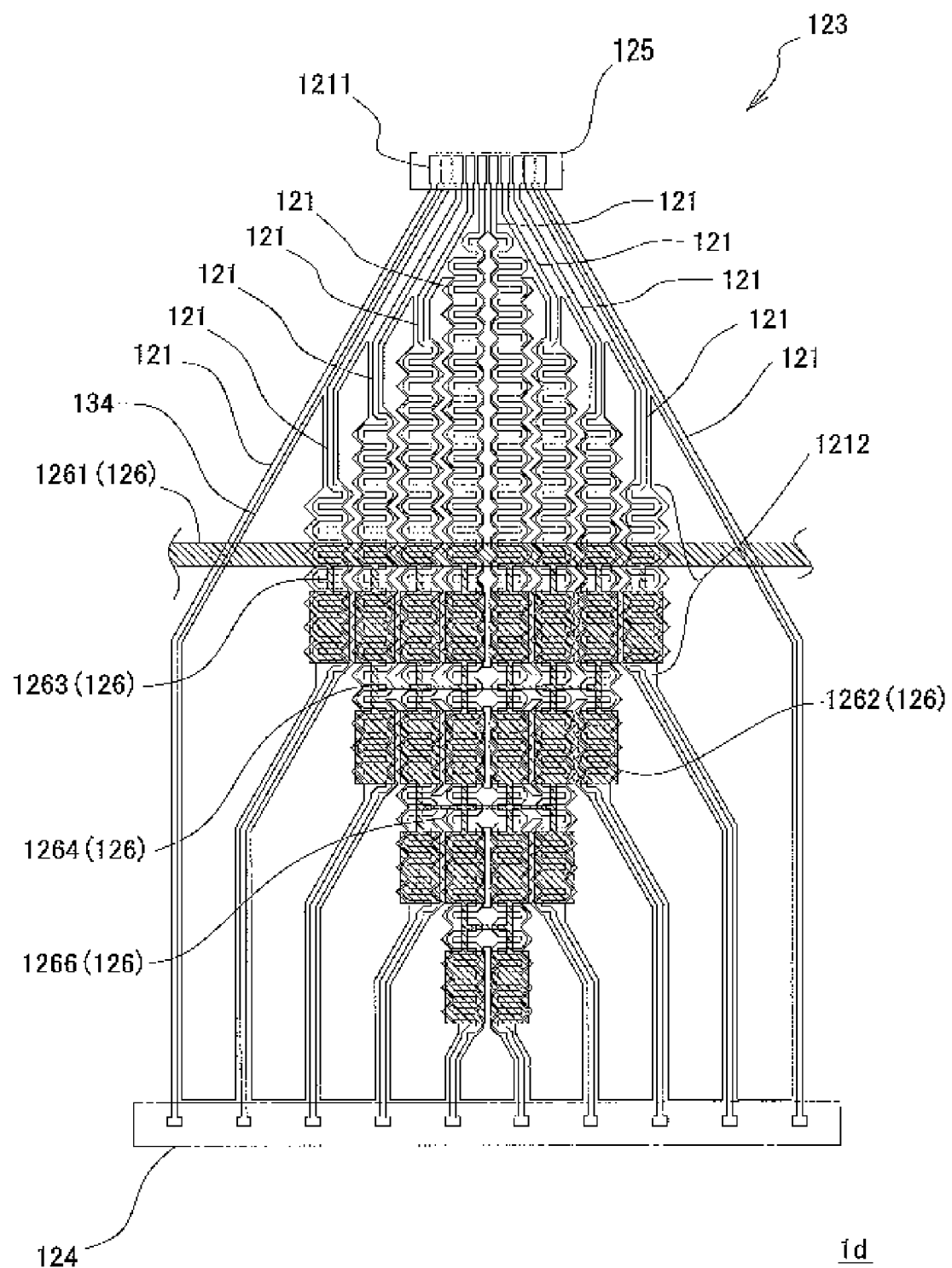
FIG. 7 is a plan view schematically showing the configuration of data drawing lines, a conductor layer, and light shielding films of a display panel substrate according to a fourth preferred embodiment of the present invention.

Next, a description of a display panel substrate 1d according to a fourth preferred embodiment of the present invention is provided. FIG. 7 is a plan view schematically showing the configuration of the data drawing lines 121, the conductor layer 26, and the light shielding films 134 of the display panel substrate 1d according to the fourth preferred embodiment of the present invention. The display panel substrate 1d according to the fourth preferred embodiment of the present invention is configured such that light shielding films are formed in the panel frame region 12 of the display panel substrate 1c according to the third preferred embodiment of the present invention.

As shown in FIG. 7, the light shielding films 134 are formed between the data drawing lines 121 (although light shielding films are formed outside of the line bundles 123, they are omitted from illustration in FIG. 7). The light shielding films 134 are not provided in portions which overlap with the fourth connecting portions 1266. In other words, the fourth connecting portions 1266 have portions which do not overlap with any of the data drawing lines 121 and the light shielding films 134.

The configuration of the display panel substrate 1d according to the fourth preferred embodiment of the present invention may be the same as that of the display panel substrate 1c according to the third preferred embodiment of the present invention except for forming the light shielding films 134 and the second insulating film 133 arranged to cover the light shielding films 134. In addition, a method of forming the line bundles 123, the conductor layer 126, and the other constituent elements of the display panel substrate 1d according to the fourth preferred embodiment of the present invention may be substantially the same as that of the display panel substrate 1b according to the second preferred embodiment of the present invention. Only the pattern of the conductor layer 126 and the pattern of the light shielding films 134 which are formed in the step of forming a conductor layer 126 and the step of forming light shielding films 134 respectively are different.

Figure 8:
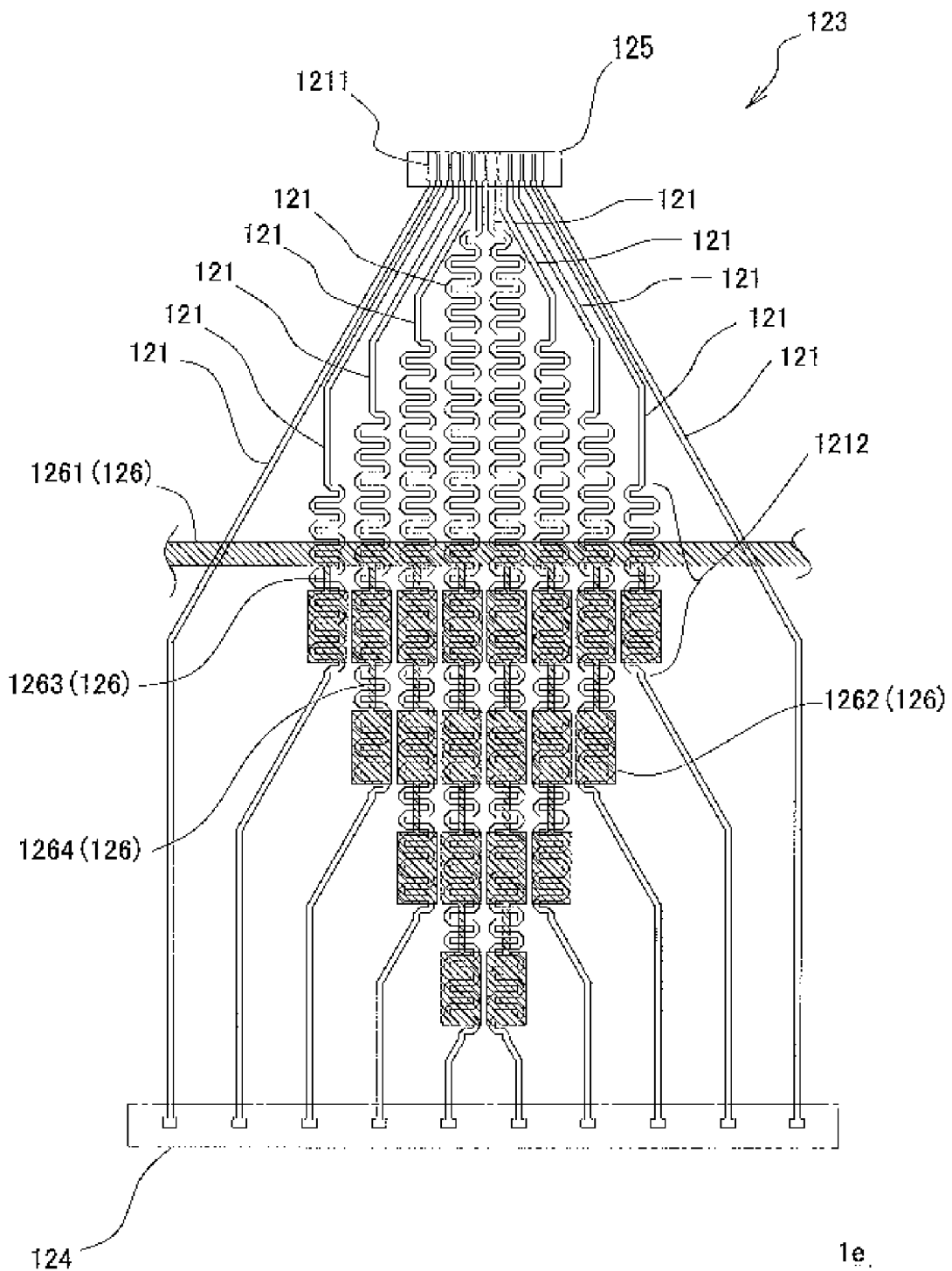
FIG. 8 is a plan view schematically showing data drawing lines, strip conductors, a linear conductor, and connecting portions of a display panel substrate according to a fifth preferred embodiment of the present invention.

Next, a description of a display panel substrate 1e according to a fifth preferred embodiment of the present invention is provided. FIG. 8 is a plan view schematically showing the data drawing lines 121, the strip conductors 1262, the linear conductor 1261, and the connecting portions 1263 and 1264 of the display panel substrate 1e according to the fifth preferred embodiment of the present invention. The configuration of the constituent elements except for the connecting portions 1263 and 1264 of the conductor layer 126 may be the same as that of the display panel substrate 1a according to the first preferred embodiment of the present invention.

As shown in FIG. 8, the linear conductor 1261 and the strip conductors 1262 adjacent to the linear conductor 1261 are electrically connected by the first connecting portions 1263, and the strip conductors 1262 are electrically connected to one another by the second connecting portions 1264.

In contrast to the first or second preferred embodiment of the present invention, the third connecting portions 1265 arranged to connect the strip conductors 1262 which overlap with one data drawing line 121 and the strip conductor 1262 which overlap with another data drawing line 121 adjacent to that data drawing line 121 are not provided. In addition, the fourth connecting portions 1266 arranged to connect the second connecting portions 1264 are not provided.

Thus, the plurality of strip conductors 1262 which overlap with one data drawing line 121 are electrically connected linearly by the second connecting portions 1264. The strip conductors 1262 which overlap with one data drawing line 121 and the strip conductors 1262 which overlap with the other data drawing lines 121 are electrically connected only by the linear conductor 1261. Owing to such a configuration, the strip conductors 1262 which overlap with one data drawing line 121 have equal or substantially equal potentials, and additionally, all of the strip conductors 1262 which overlap with the data drawing lines 121 have equal or substantially equal potentials.

The first connecting portions 1263 arranged to electrically connect the linear conductor 1261 and the strip conductors 1262 and the second connecting portions 1264 arranged to electrically connect the strip conductors 1262 may have the same configuration as those of the display panel substrate 1a according to the first preferred embodiment of the present invention. To be specific, the first connecting portions 1263 and the second connecting portions 1264 have at least one portion which does not overlap with the data drawing lines 121.

Figure 9:
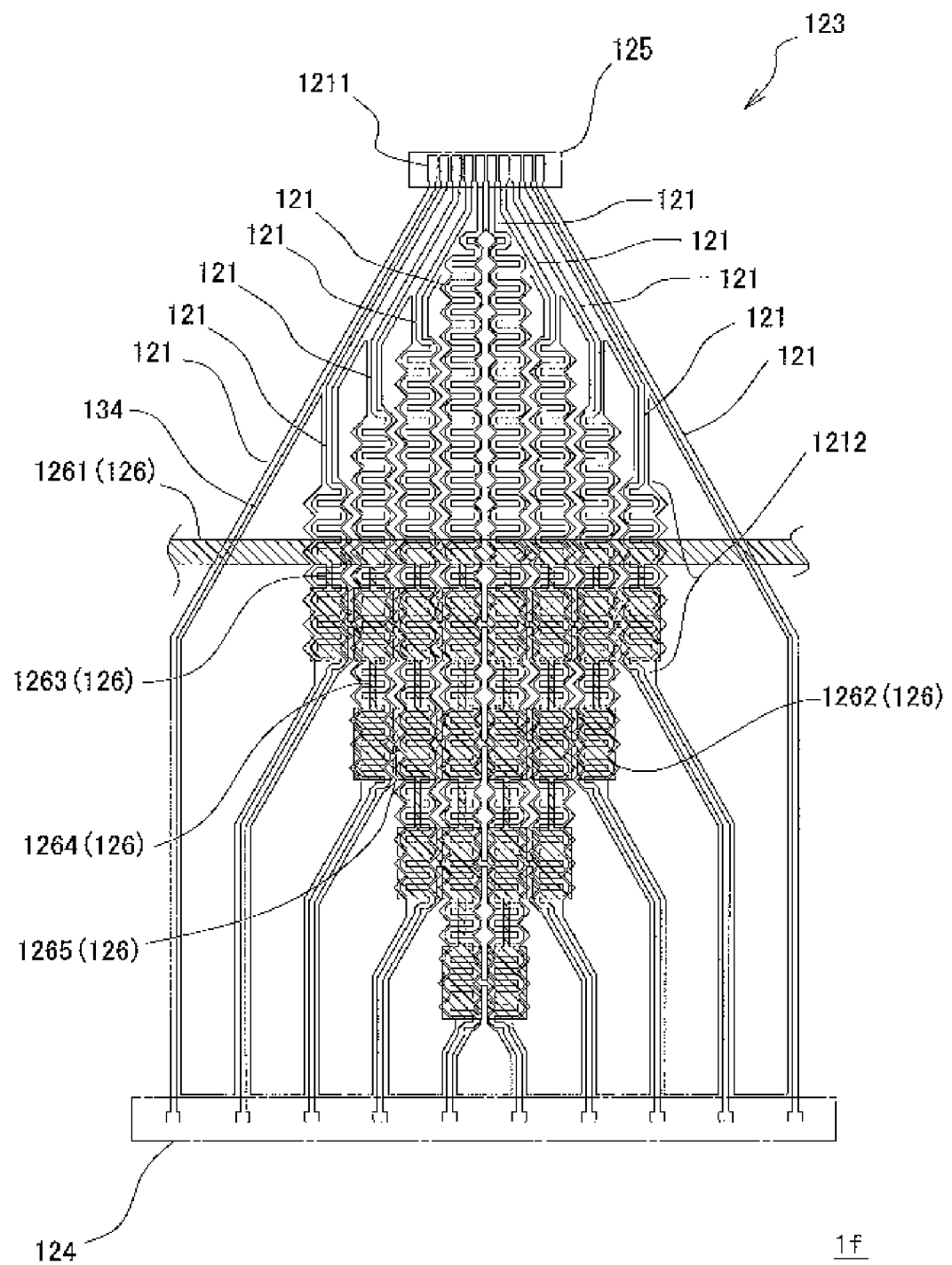
FIG. 9 is a plan view schematically showing the configuration of data drawing lines, a conductor layer, and light shielding films of a display panel substrate according to a sixth preferred embodiment of the present invention.

Next, a description of a display panel substrate 1f according to a sixth preferred embodiment of the present invention is provided. FIG. 9 is a plan view schematically showing the configuration of the data drawing lines 121, the conductor layer 126, and the light shielding films 134 of the display panel substrate if according to the sixth preferred embodiment of the present invention. The display panel substrate if is configured such that the light shielding film 134 are formed in the panel frame region 12 of the display panel substrate 1e according to the fifth preferred embodiment of the present invention.

As shown in FIG. 9, the light shielding films 134 are formed in the panel frame region 12 (although the light shielding films 134 are also formed outside of the line bundles 123, they are omitted from illustration in FIG. 9). The first connecting portions 1263 and the second connecting portions 1264 have portions which do not overlap with any of the data drawing lines 121 and the light shielding films 134.

If the light shielding films 134 are not provided in the spaces between the data drawing lines 121 which are located in the zigzag portions 1212 of the data drawing lines 121, it is not necessary to arrange the pattern of the light shielding films 134 so as not to overlap with the first connecting portions 1263 or the second connecting portions 1264.

The configuration of the display panel substrate 1f according to the sixth preferred embodiment of the present invention may be the same as that of the display panel substrate 1e according to the fifth preferred embodiment of the present invention except for forming the light shielding films 134 and the second insulating film 133 covering the light shielding films 134. In addition, a method of forming the line bundles 123, the conductor layer 126, and the other constituent elements of the display panel substrate 1f according to the sixth preferred embodiment of the present invention may be substantially the same as that of the display panel substrate 1b according to the second preferred embodiment of the present invention. Only the pattern of the conductor layer 126 and the pattern of the light shielding films 134 in the step of forming a conductor layer 126 and the step of forming light shielding films 134 respectively are different.

Next, a description of the configuration of a display panel 2 having any one of the display panel substrates 1a to 1f according to the above described preferred embodiments of the present invention is provided.

Figure 10:
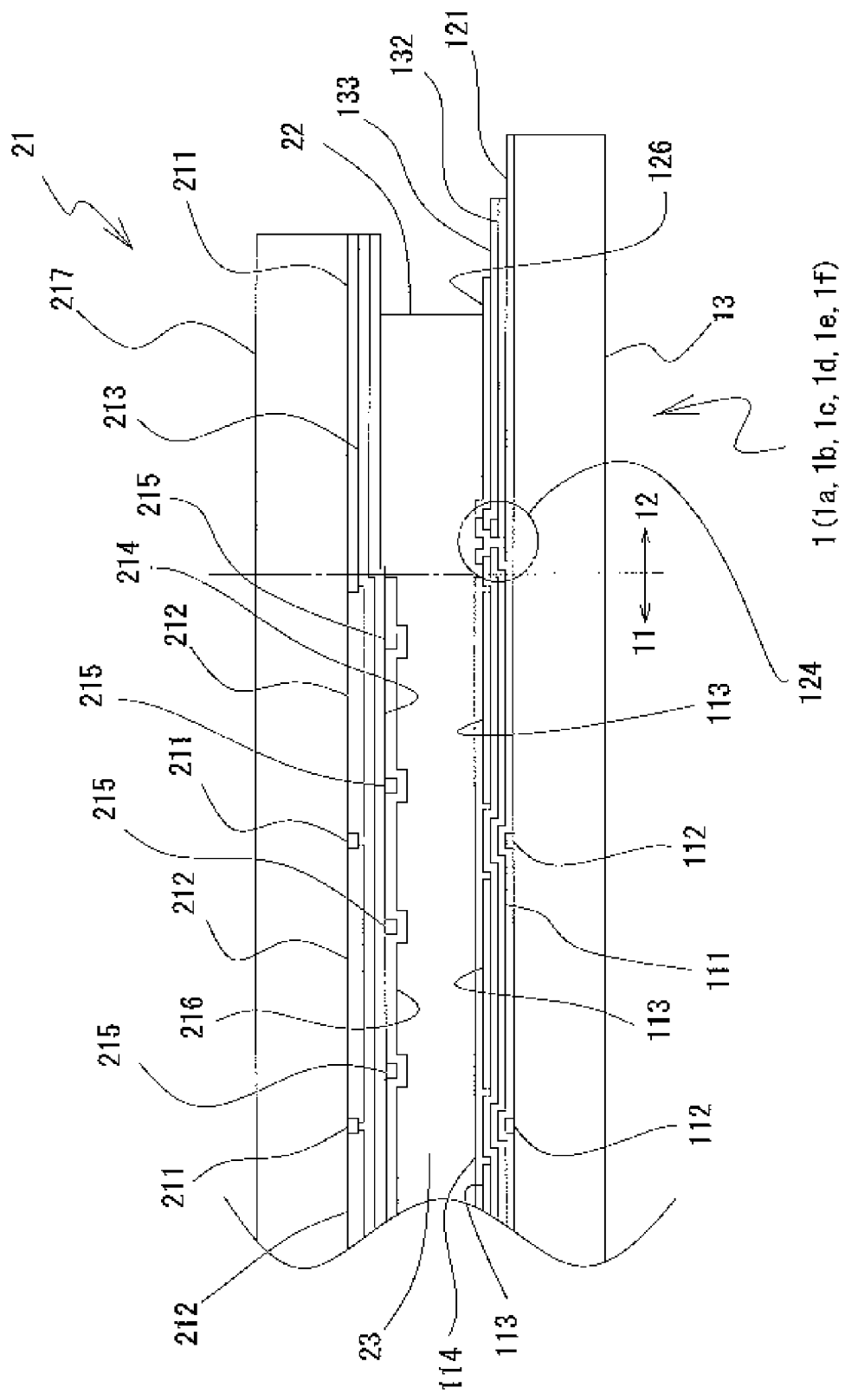
FIG. 10 is a cross-sectional view schematically showing the cross-sectional structure of a display panel having the display panel substrate according to any one of the preferred embodiments of the present invention.

FIG. 10 is a cross-sectional view schematically showing the cross-sectional structure in an edge portion (a part of the active region 11 and the panel frame region 12) of the display panel 2 having any one of the display panel substrates 1a to 1f (hereinafter, assigned reference numeral "1") according to the above described preferred embodiments of the present invention. As shown in FIG. 10, the display panel substrate 1 according to any one of the above described preferred embodiments of the present invention and a common substrate 21 are disposed opposed to each other having a given minute gap therebetween. A sealing member 22 is provided to surround the active region 11, and the display panel substrate 1 and the common substrate 21 are bonded by the sealing member 22. A region enclosed with the sealing member 22 is filled with liquid crystals.

The active region 11 of the display panel substrate 1 according to any one of the preferred embodiments of the present invention has a matrix arrangement of a plurality of pixel electrodes 113 and switching elements (not shown; e.g., thin film transistors) arranged to drive the respective pixel electrodes 113. The active region 11 is provided with a plurality of data signal lines 111 arranged to transmit data signals to source electrodes of the switching elements and a plurality of scanning signal lines 112 arranged to transmit scanning signals to gate electrodes of the switching elements. The data signal lines 111 are placed substantially parallel to one another, and the scanning signal lines 112 are placed substantially parallel to one another and substantially perpendicular to the data signal lines 111. In addition, an alignment layer 114 is formed on the display panel substrate 1 according to any one of the preferred embodiments of the present invention.

One end of each of the data drawing lines 121 is located in the contact portion 124 at the edge of the active region 11 and is electrically connected to the respective data signal lines 111 in the contact portion 124.

A brief description of the configuration of the common substrate 21 is given. The common substrate 21 is configured such that a black matrix 211 is formed on a transparent substrate 217 made preferably of glass, and color layers 212 made of red, green, and blue color resists are formed in squares of the black matrix 211. The squares in which the color layers 212 are formed are arranged in a given order. A protective film 213 is formed on the black matrix 211 and the color layers 212, and a transparent electrode (common electrode) 214 is formed on the protective film 213. Alignment control structural elements 215 arranged to control alignment of liquid crystals are formed on the transparent electrode (common electrode) 214, on which an alignment layer 216 is formed. The transparent electrode (common electrode) 214 is electrically connected to a common potential line (not shown).

The sealing member 22 has electrical conductivity since fine particles made of a conductive material (e.g., gold beads) are mixed in the sealing member 22. The sealing member 22 is in contact with both of an exposed portion of the linear conductor 1261 of the display panel substrate 1 and the common electrode 214 of the common substrate 21. Thus, the strip conductors 1262 and the linear conductor 1261 are electrically connected to the common electrode 214 of the common substrate 21 and thus have equal or substantially equal potentials to the common electrode 214.

Next, a description of a method of correcting a display defect caused by an electrical short between the data drawing line 121 and the strip conductor 1262 in the display panel 2 having the display panel substrate 1 according to any one of the preferred embodiments of the present invention is provided.

When a conductive foreign particle adheres to the panel frame region 12 of the display panel substrate 1 in the process of producing the display panel substrate 1, the foreign particle could pass through the insulating film between the data drawing line 121 and the strip conductor 1262 (in FIG. 10, the first insulating film 132 and the second insulating film 133) and electrically connect the specific data drawing line 121 and the strip conductor 1262.

Because the conductor layer 126 is electrically connected to the common electrode 214 of the common substrate 21 by the sealing member 22 as described above, the specific data drawing line 121 and the common substrate 214 of the common substrate 21 have equal or substantially equal potentials. Thus, the pixel electrodes 113 which receive data signals through the specific data drawing line 121 and the common electrode 214 of the common substrate 21 have equal potentials. Accordingly, if the display panel 2 is a normally black type, the pixels normally make display with substantially lowest luminance. Thus, a streaky display defect along the data signal line 111 occurs on the display panel 2 (in the case of a display panel of a normally black type, a black linear display defect occurs on the display panel).

In such a case, a correction is made by electrically disconnecting the strip conductor 1262 which is shorted with the data drawing line 121 from the adjacent strip conductors 1262 or the linear conductor 1261. This correction cuts off conduction between the specific data drawing line 121 and the common electrode 214 of the common substrate 21, allowing given data signals to be transmitted to the data signal line 111.

A specific description of the correction is provided below. The display panel substrate 1b according to the second preferred embodiment of the present invention is taken as an example in the following description of the correction because substantially the same correction methods can be used for the display panel having the display panel substrate 1a according to the first preferred embodiment of the present invention and the display panel having the display panel substrate 1b according to the second preferred embodiment of the present invention.

Figure 11:
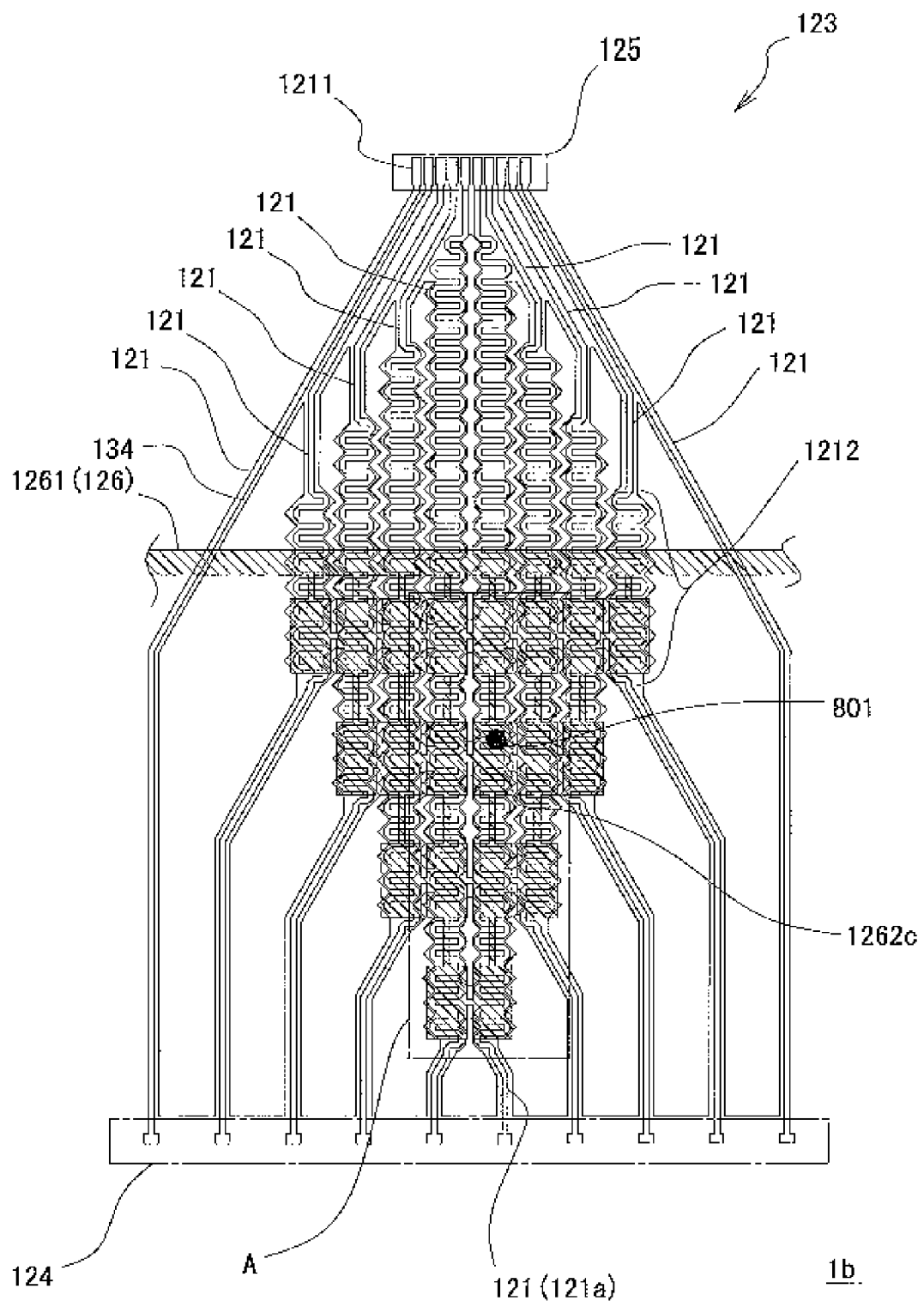
FIG. 11 is a plan view schematically showing the state of a short between a specific one of the data drawing lines and a specific one of the strip conductors in the display panel having the display panel substrate according to the second preferred embodiment of the present invention, and a method of correcting a display defect caused by the short.

FIG. 11 is a plan view schematically showing the state of a short between a specific data drawing line 121a and a specific strip conductor 1262c in the display panel having the display panel substrate 1b according to the second preferred embodiment of the present invention. FIG. 11 shows an example in which the specific data drawing line 121a and the specific strip conductor 1262c which overlaps with the specific data drawing line 121a are electrically shorted by a foreign particle 801, and a streaky display defect accordingly occurs on the display panel 2.

First, a lighting inspection is performed on the display panel 2. When the specific data drawing line 121a and the specific strip conductor 1262c which overlaps with the specific data drawing line 121a are electrically shorted as described above, a streaky display defect could occur in an image displayed on the display panel 2. If a streaky display defect is detected by the lighting inspection of the display panel 2 and the cause of the display defect is judged to be a short between the specific data drawing line 121a and any one of the strip conductors 1262 which overlap with the specific data drawing line 121a, the data drawing line 121a arranged to transmit data signals to the pixels at which the display defect occurs is observed through a magnifying glass in order to identify the location of the short.

Figure 12:
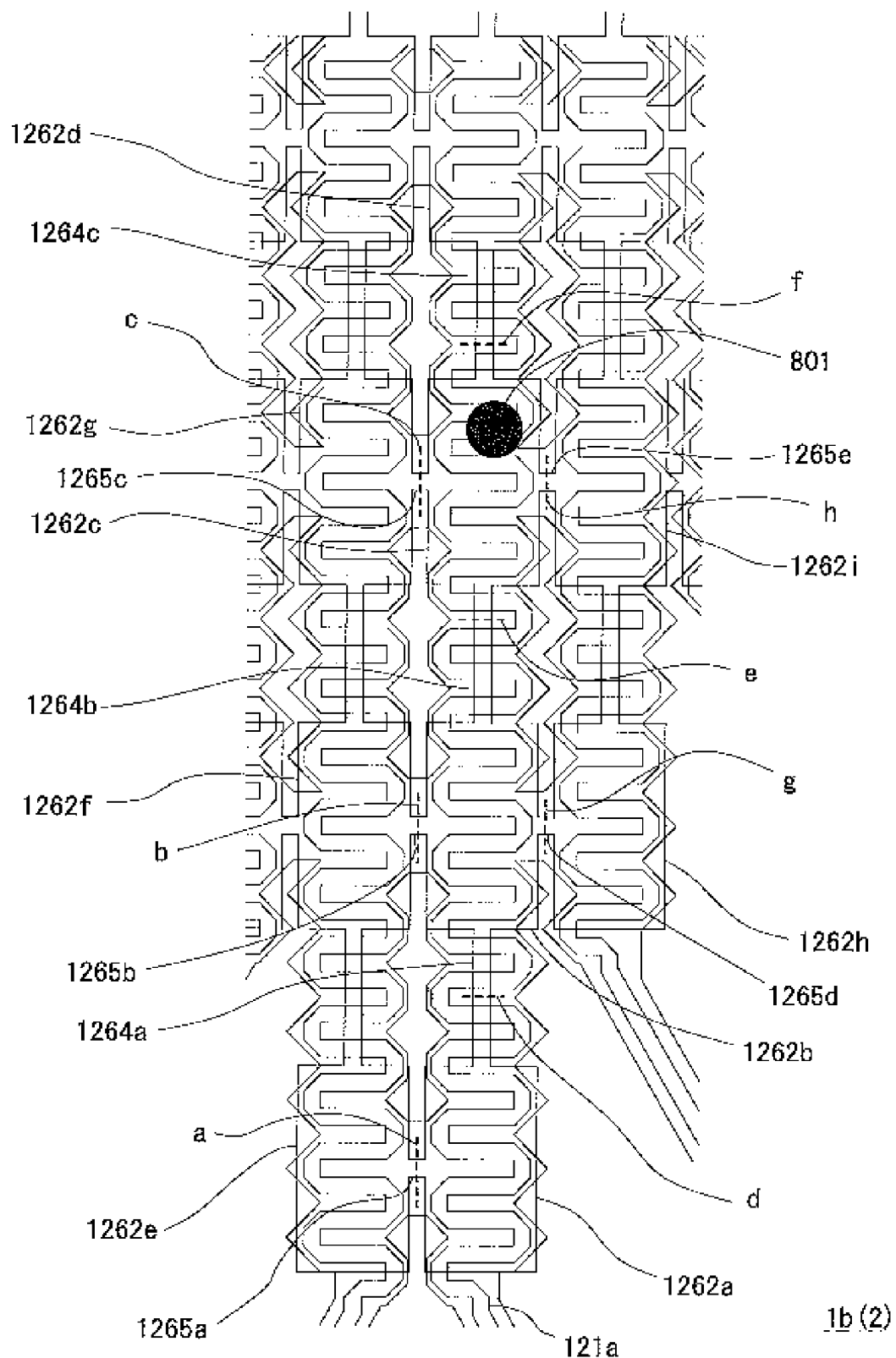
FIG. 12 is a magnified plan view of the portion A in FIG. 11.

FIG. 12 is a magnified plan view of the portion A in FIG. 11. If the strip conductor 1262c which is shorted with the data drawing line 121a is specified, two second connecting portions 1264b and 1264c arranged to connect the specified strip conductor 1262c and strip conductors 1262d and 1262b adjacent to the specified strip conductor 1262c and two third connecting portions 1265c and 1265e arranged to connect the specified strip conductor 1262c and strip conductors 1262g and 1262i adjacent to the specified strip conductor 1262c are cut. If the strip conductor which is shorted with the data drawing line 121 is connected to the linear conductor by the first connecting portion 1263, the first connecting portion 1263 is also cut.

To be specific, a laser beam is projected from the outside of the display panel 2, and the connecting portions 1264b, 1264c, 1265c and 1265e are cut by the energy of the laser beam. As described above, the connecting portions 1264b, 1264c, 1265c and 1265e of the display panel substrate 1b according to the second preferred embodiment of the present invention have portions which do not overlap with any of the data drawing lines 121 and the light shielding films 134. Therefore, the laser beam from the outside can be projected onto the connecting portions 1264b, 1264c, 1265c and 1265e through the unoverlapping portions in order to cut the connecting portions 1264b, 1264c, 1265c and 1265e. The connecting portions 1264b, 1264c, 1265c and 1265e are cut at the broken lines "e", "f", "c" and "h". Because the light shielding films 134 are not provided to the display panel substrate 1a according to the first preferred embodiment of the present invention, it is prevented that the light shielding films 134 put impediments in cutting the third connecting portions 1265c and 1265e.

When the connecting portions 1264b, 1264c, 1265c and 1265e are cut as describe above, the electrical connection between the data drawing line 121a and the common electrode 214 of the common substrate 21 is cut off. Thus, the data drawing line 121a is enabled to transmit given data signals to the data signal line, so that the display defect is eliminated. In addition, among the plurality of strip conductors which overlap with the data drawing line 121a, the strip conductors other than the strip conductor 1262c which is electrically disconnected from the adjacent strip conductors unchangeably provide parasitic capacitances. Thus, parasitic capacitances of the data drawing line 121a are not significantly changed by the correction, and an influence of the correction on the transmission of data signals can be minimized.

There may be a case where the location of the short between the data drawing line 121a and the strip conductor 1262c cannot be identified. In such a case, the process of electrically disconnecting one of the plurality of strip conductors from the adjacent conductors and the process of performing the lighting inspection after the disconnection in order to check if the streaky display defect has been eliminated are repeated until the display defect is eliminated.

Specifically, first, among the plurality of strip conductors which overlap with the data drawing line 121a arranged to transmit data signals to the pixel group at which the display defect occurs, the one which is farthest from the linear conductor 1261 (i.e., among the strip conductors which are linearly connected, the one which is located at the end with reference to the linear conductor 1261) is disconnected from the adjacent conductors. In the example shown in FIG. 12, the end strip conductor 1262a is electrically disconnected from the adjacent strip conductors 1262e and 1262b. To be specific, the second connecting portion 1264a is cut at the broken line "d" and the third connecting portion 1265a is cut at the broken line "a", so that the strip conductor 1262a are electrically disconnected from the adjacent strip conductors 1262e and 1262b.

Then, the lighting inspection is performed again. If the streak display defect is still detected by the lighting inspection, the strip conductor 1262b which is located second from the end is electrically disconnected from the adjacent strip conductors 1262f, 1262h and 1262c. In the example shown in FIG. 12, the second connecting portion 1264b is cut at the broken line "e", and the third connecting portions 1265b and 1265d are cut at the broken lines "b" and "g". Thus, the strip conductor 1262b is electrically disconnected from the three adjacent strip conductors 1262c, 1262f and 1262h.

Then, the lighting inspection is performed again. Thereafter, the process of electrically disconnecting the strip conductor which overlaps with the data drawing line 121a arranged to transmit data signals to the pixel group at which the display defect occurs from the adjacent conductors and the process of performing the lighting inspection after the disconnection in order to check if the streaky display defect has been eliminated are repeated. In the example shown in FIG. 12, when the strip conductor 1262c which is located third from the end is electrically disconnected from the three adjacent strip conductors 1262g, 1262c and 1262d, the display defect is eliminated on the condition that there are no other defects.

The order of electrically disconnecting the plurality of strip conductors from the adjacent strip conductors (and from the linear conductor if connected to the linear conductor) is not limited to the above described order. Although the strip conductor which is located at the end is firstly disconnected in the description above, the strip conductor with the possibility of a short may be firstly disconnected, by which the same action and effect can be achieved.

In the above described method, there is a possibility that the strip conductor which is not shorted with the data drawing line is unintentionally electrically disconnected from the adjacent strip conductors. However, it is judged that such an occasion has little influence on the display quality of the display panel.

To be specific, the strip conductor which has been electrically disconnected from the adjacent strip conductors or the linear conductor does not have normal parasitic capacitances. By such a method, the strip conductors which should not be disconnected could be unintentionally disconnected, and therefore the parasitic capacitances of this data drawing line become different from the parasitic capacitances of the other data drawing lines. Thus, the state of data signals to be transmitted (e.g., delay of signals) could be different.

However, although there is a slight difference in the state of data signals if the parasitic capacitances are different, data signals can be still transmitted to the data signal line, and the pixel group which receives data signals through the data signal line can make display based on the transmitted data signals. In addition, because the data signal lines in the line bundle have uniform parasitic capacitances, the difference in the display state is less noticeable even if the parasitic capacitances of a specific one of the data signal lines are different from the parasitic capacitances of the other data signal lines in some degree. Therefore, it is judged that an influence on the display quality of the display panel is little.

Next, descriptions of a method of correcting the display panel having the display panel substrate 1c according to the third preferred embodiment of the present invention and a method of correcting the display panel having the display panel substrate 1d according to the fourth preferred embodiment of the present invention are provided. The display panel substrate 1d according to the fourth preferred embodiment of the present invention is taken as an example in the following description because the method of correcting the display panel having the display panel substrate 1c according to the third preferred embodiment of the present invention is substantially the same as the method of correcting the display panel having the display panel substrate 1d according to the fourth preferred embodiment of the present invention.

Figure 13:
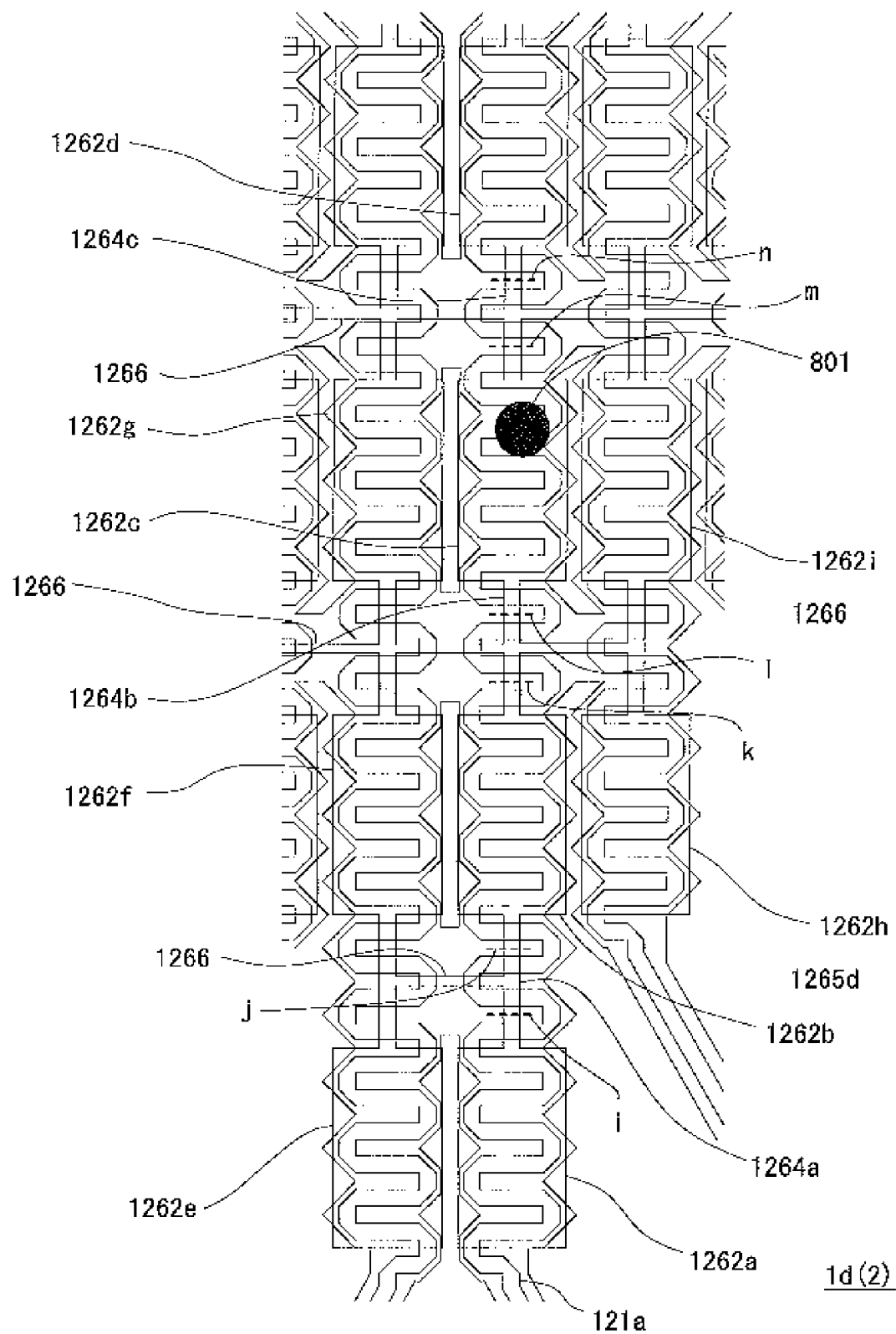
FIG. 13 is a plan view schematically showing the state of a short between a specific one of the data drawing lines and a specific one of the strip conductors which overlap with the data drawing lines in the display panel having the display panel substrate according to the fourth preferred embodiment of the present invention, and a method of correcting a display defect caused by the short.

FIG. 13 is a plan view schematically showing the state of a short between the specific data drawing line 121a and the specific strip conductor 1262c which overlaps with the specific data drawing line 121a, and the method of correcting a display defect caused by the short. FIG. 13 is a magnified plan view of the portion A in FIG. 11. FIG. 13 shows an example in which the specific data drawing line 121a and the specific strip conductor 1262c which overlaps with the specific data drawing line 121a are shorted by a foreign particle 801, and a streaky display defect accordingly occurs in an image displayed on the display panel.

First, a lighting inspection is performed on the display panel 2 to check if a streaky display defect occurs in an image displayed on the display panel 2. If a streaky display defect is detected by the lighting inspection of the display panel 2 and the cause of the display defect is judged to be a short between the specific data drawing line 121a and one of the strip conductors 1262 which overlap with the specific data drawing line 121a, the data drawing line 121a arranged to transmit data signals to the pixels at which the display defect occurs is observed through a magnifying glass in order to identify the location of the short.

If the strip conductor 12 which is shorted with the specific data drawing line 121a is specified, the specified strip conductor 1262c is electrically disconnected from the adjacent strip conductors 1262b, 1262d, 1262g and 1262i. To be specific, the second connecting portions 1264b and 1264c connected to the specified strip conductor 1262c are cut at the broken lines "l" and "m" by a laser beam. Because the connecting portions 1264b and 1264c do not overlap with any of the data drawing lines 121 and the light shielding films 134 at the broken lines "l" and "m", the laser beam from the outside of the display panel 2 can be projected onto the connecting portions 1264b and 1264c at the broken lines "l" and "m".

In the display panel having the display panel substrate 1c according to the third preferred embodiment of the present invention or the display panel having the display panel substrate 1d according to the fourth preferred embodiment of the present invention, for electrically disconnecting one strip conductor from the adjacent strip conductors, it is enough if two second connecting portions are cut by a laser beam (one first connecting portion and one second connecting portion are cut if the strip conductor is adjacent to the linear conductor). Accordingly, the number of laser beam projections during the correction can be decreased.

When the strip conductor shorted with the data drawing line 121a is electrically disconnected from the adjacent strip conductors (and from the linear conductor if the strip conductor is adjacent to the linear conductor), the electrical connection between the data drawing line 121a and the common electrode 214 of the common substrate 21 is cut off. Thus, the data drawing line 121a is enabled to transmit given data signals to the data signal line, so that the display defect is eliminated. In addition, among the plurality of strip conductors which overlap with the data drawing line 121a, the strip conductors other than the strip conductor which is electrically disconnected from the adjacent strip conductors unchangeably provide parasitic capacitances. Thus, parasitic capacitances of the data drawing line 121a are not significantly changed by the correction, and an influence of the correction on the transmission of data signals can be minimized.

If the location of the short cannot be identified, the process of electrically disconnecting one of the plurality of strip conductors from the adjacent conductors and the process of performing the lighting inspection in order to check if the streaky display defect has been eliminated are repeated.

Specifically, first, among the plurality of strip conductors which overlap with the data drawing line 121a arranged to transmit data signals to the pixel group at which the display defect occurs, the one which is farthest from the linear conductor (i.e., among the strip conductors which are linearly connected, the one which is located at the end with reference to the linear conductor) is disconnected from the adjacent conductors. To be specific, the connecting portion is cut by a laser beam. Thus, the strip conductor is electrically disconnected from the adjacent strip conductors.

In the example shown in FIG. 13, the strip conductor 1262a which is located at the end is electrically disconnected from the adjacent strip conductors 1262b and 1262e only by cutting the second connecting portion 1264a at the broken line "i".

Then, the lighting inspection is performed again. If the streak display defect is still detected by the lighting inspection, the strip conductor which is located second from the end is electrically disconnected from the adjacent strip conductors. In the example shown in FIG. 13, the second connecting portions 1264a and 1264b connected to the strip conductor 1262b which is located second from the end are cut at the broken lines "j" and "k". Thus, the strip conductor 1262b is electrically disconnected from the three adjacent strip conductors 1262c, 1262f and 1262h.

Then, the lighting inspection is performed again. If the streak display defect is still detected by the lighting inspection, the strip conductor which is located third from the end is electrically disconnected from the adjacent strip conductors. In the example shown in FIG. 13, the two second connecting portions 1264b and 1264c connected to the strip conductor 1262c which is located third from the end are cut at the broken lines "l" and "m". Thus, the strip conductor 1262c is electrically disconnected from the adjacent strip conductors 1262d, 1262g and 1262i.

Thereafter, the process of electrically disconnecting the strip conductor which overlaps with the data drawing line arranged to transmit data signals to the pixel group at which the display defect occurs from the adjacent strip conductors and the process of performing the lighting inspection in order to check if the streaky display defect has been eliminated are repeated. In the example shown in FIG. 13, when the strip conductor 1262c which is located third from the end is electrically disconnected from the adjacent strip conductors 1262d, 1262g, and 1262i, the display defect is eliminated on the condition that there are no other defects.

As described above, the display panel having the display panel substrate according to the third or fourth preferred embodiment of the present invention can be corrected by the same method as the display panel having the display panel substrate according to the first or second preferred embodiment of the present invention, and the same action and effect can be achieved.

Next, descriptions of the method of correcting the display panel having the display panel substrate 1e according to the fifth preferred embodiment of the present invention and the method of correcting the display panel having the display panel substrate 1f according to the sixth preferred embodiment of the present invention are provided. The descriptions are given taking the display panel substrate 1f according to the sixth preferred embodiment of the present invention as an example because the method of correcting the display panel having the display panel substrate 1e according to the fifth preferred embodiment of the present invention is substantially the same as the method of correcting the display panel having the display panel substrate 1f according to the sixth preferred embodiment of the present invention.

Figure 14:
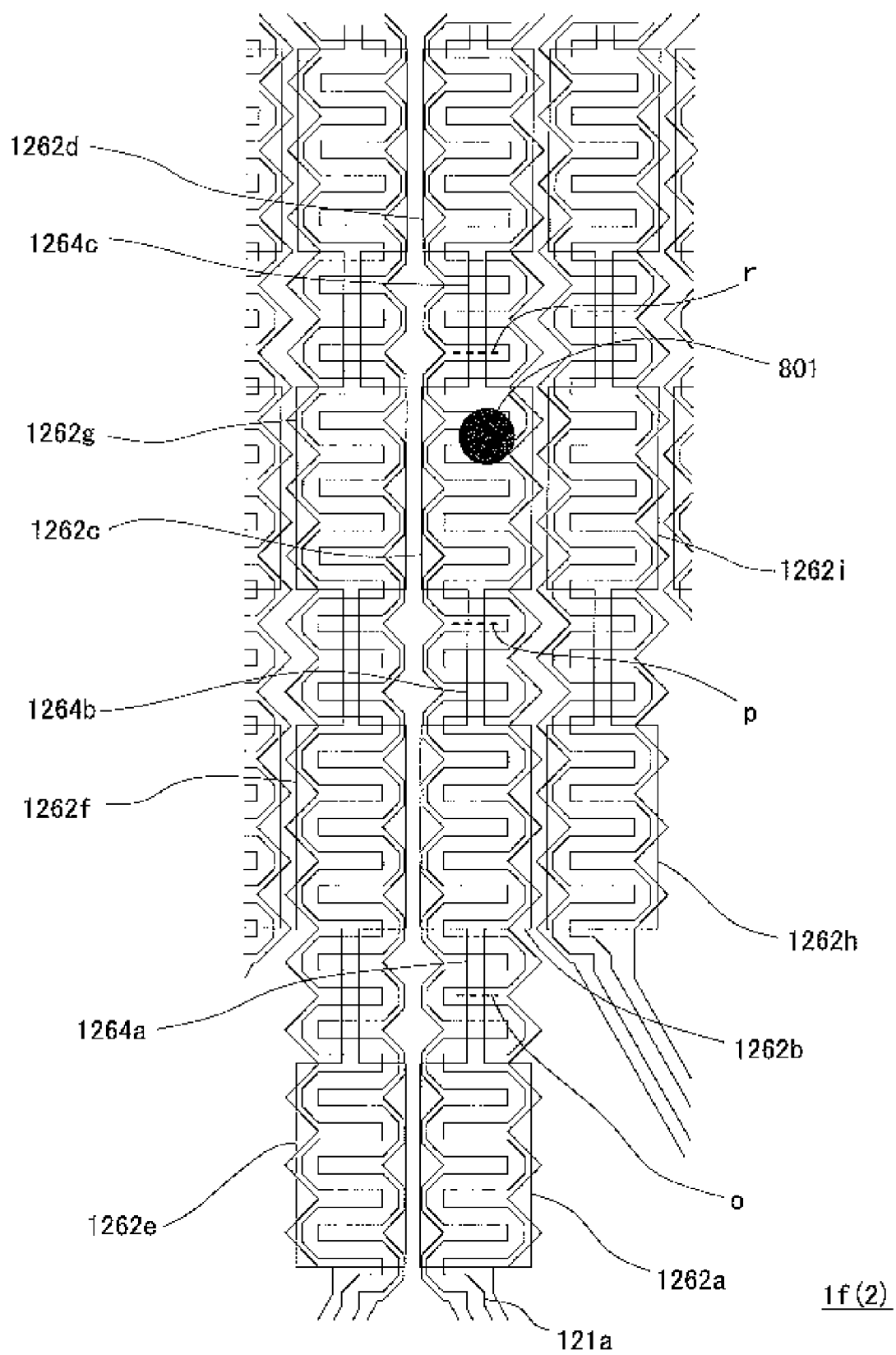
FIG. 14 is a plan view schematically showing the state of a short caused by a conductive foreign particle between a specific one of the data drawing lines and a specific one of the strip conductors which overlap with the data drawing lines in the display panel having the display panel substrate according to the sixth preferred embodiment of the present invention, and a method of correcting a display defect caused by the short.

FIG. 14 is a plan view schematically showing the state of a short caused by a conductive foreign particle 801 between the specific data drawing line 121a and the specific strip conductor 1262c and a method of correcting a display defect caused by the short. FIG. 14 shows an example in which the specific data drawing line 121a and the specific strip conductor 1262c which overlaps with the specific data drawing line 121a are shorted, and a streaky display defect accordingly occurs on the display panel 2.

A lighting inspection is performed on the display panel in a similar manner to the method of correcting the display panel having the display panel substrate according to the first or second preferred embodiment of the present invention. When a streaky display defect is detected by the lighting inspection and the display defect is judged to be caused by a short between the data drawing line and the strip conductor which overlaps with the data drawing line, the location of the short is to be identified.

If the strip conductor 1262c which is shorted with the data drawing line 121a is specified, the two second connecting portions 1264b and 1264c arranged to electrically connect the strip conductor 1262c and the adjacent strip conductors 1262b and 1262d are cut by a laser beam. To be specific, the connecting portions 1264b and 1264c are cut at the broken lines "p" and "r" where the connecting portions 1264b and 1264c do not overlap with the data drawing line 121a. Among the two second connecting portion 1264b and 1264c, only the second connecting portion 1264c closer to the linear conductor 1261 may be disconnected. In the cutting, the same method as the method of correcting the display panel having the display panel substrate according to the first or second preferred embodiment of the present invention may be used.

Because the strip conductors are electrically connected only linearly, the electrical connection between the data drawing line 121a and the common electrode 214 of the common substrate 21 is cut off by cutting the second connecting portion (or the first connecting portion) connected to the shorted strip conductor 1262c which is closer to the linear conductor 1261. Thus, the data drawing line 121a is enabled to transmit given data signals to the data signal line, so that the display defect is eliminated. By this configuration, the number of laser beam projections during the correction can be decreased.

If the location of the short between the data drawing line and the strip conductor cannot be identified, the process of electrically disconnecting one of the strip conductors from the adjacent strip conductors and the process of performing the lighting inspection in order to check if the streaky display defect has been eliminated are repeated as described above.

To be specific, first, among the plurality of strip conductors which overlap with the data drawing line arranged to transmit data signals to the pixel group at which the display defect occurs, the one which is farthest from the linear conductor (i.e., among the strip conductors which are linearly connected, the one which is located at the end with reference to the linear conductor) is disconnected from the adjacent conductors. To be specific, the connecting portion between the strip conductor and the adjacent strip conductor closer to the linear conductor is cut.

In the example shown in FIG. 14, because there is only the second connecting portion 1264a which is connected to the strip conductor 1262a, the strip conductor 1262a is electrically disconnected from the linear conductor 1261 only by cutting the second connecting portion 1264a.

Then, the lighting inspection is performed again. If the streak display defect is still detected by the lighting inspection, among the two second connecting portions 1264a and 1264b which are connected to the strip conductor 1262b which is located second from the end, the second connecting portion 1264b closer to the linear conductor 1261 is cut to electrically disconnect the strip conductor 1262b from the adjacent strip conductor 1262c. Only by cutting one connecting portion, the electrical conduction between the strip conductor 1262b and the common electrode 24 of the common substrate 21 is cut off.

Then, the lighting inspection is performed again. If the streak display defect is still detected by the lighting inspection, the strip conductor 1262c which is located third from the end is electrically disconnected from the adjacent strip conductors. Also in this case, the electrical conduction between the strip conductor 1262c and the common electrode 24 of the common substrate 21 is cut off by cutting the second connecting portion closer to the linear conductor 1261.

Thereafter, the process of electrically disconnecting the strip conductor which overlaps with the data drawing line arranged to transmit data signals to the pixel group at which the display defect occurs from the adjacent strip conductors and the process of performing the lighting inspection in order to check if the streaky display defect has been eliminated are repeated. In the example shown in FIG. 14, when the strip conductor 1262c which is located third from the end is electrically disconnected from the adjacent strip conductors, the display defect is eliminated on the condition that there are no other defects.

As described above, the display panel having the display panel substrate according to the fifth or sixth preferred embodiment of the present invention can be corrected by the same method as the display panel having the display panel substrate according to the first or second preferred embodiment of the present invention, and the same action and effect can be achieved.

Next, a description of the flow of a method of producing the display panel having the display panel substrate according to any one of the first to third preferred embodiments of the present invention (hereinafter referred to as "display panel substrate according to the preferred embodiment of the present invention") are provided.

FIGS. 15A to 15L are cross-sectional views schematically showing steps in the method of producing the display panel substrate 1 according to any one of the preferred embodiments of the present invention. FIGS. 15A to 15F show steps of forming pixels in the active region, and FIGS. 15G to 15L show steps of forming bundles of drawing lines and other constituent elements in the panel frame region. FIGS. 15A and 15G, FIGS. 15B and 15H, FIGS. 15C and 15I, FIGS. 15D and 15J, FIGS. 15E and 15K, and FIGS. 15F and 15L show the same steps respectively. FIGS. 15A to 15L are given only for the purpose of illustration and do not show any cross sectional structure along a specific section line of the display panel substrate according to any one of the preferred embodiments of the present invention.

The display panel substrate 1 according to the preferred embodiments of the present invention is configured such that on one side of a transparent substrate 13 preferably made of glass, a conductor film, a semiconductor film, an insulating film, and other constituent elements in given shapes are formed in layers in a given order.

Figure 15A:
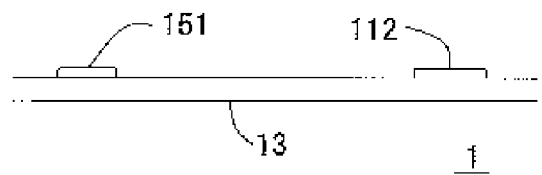
FIGS. 15A to 15L are cross-sectional views schematically showing steps in a method of producing the display panel substrate according to any one of the preferred embodiments of the present invention.

As shown in FIG. 15A, scanning signal lines 112, auxiliary capacitance lines (not shown), and gate electrodes 151 of switching elements (i.e., thin film transistors) are formed in an active region 11. In this step, data drawing lines 121 are formed in a panel frame region 12 at the same time.

To be specific, a single-layered or multi layered first conductor film preferably made of chromium, tungsten, molybdenum, or aluminum is formed on the transparent substrate 13. Conventionally used spattering is preferably used in forming the first conductor layer. Although the thickness of the first conductor layer is not particularly limited, a thickness of about 100 nm is preferable.

The formed first conductor film is subjected to patterning so as to have patterns of the scanning signal lines 112, the auxiliary capacitance lines (not shown), and the gate electrodes 151 of the switching elements. Wet etching can be used for the patterning of the first conductor film. For example, if the first conductor film is made of chromium, wet etching using a solution of $(NH_4)_2[Ce(NH_3)_6]+HNO_3+H_2O$ is preferable.

Figure 15G:
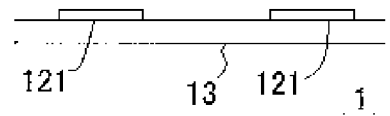

As a result, the scanning signal lines 112, the auxiliary capacitance lines (not shown), and the gate electrodes 151 of the switching elements having the given patterns are provided in the active region 11 as shown in FIG. 15A. The data drawing lines 121 are provided in the panel frame region 12 as shown in FIG. 15G. The shape of the data drawing lines 121 is common among the display panel substrates according to the first to sixth preferred embodiments of the present invention.

Figure 15B:
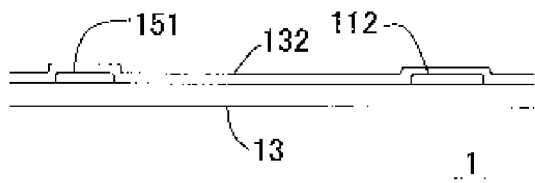
Figure 15H:
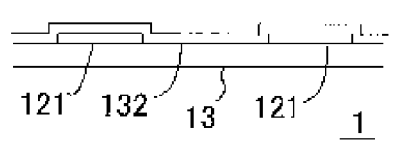
Figure 15C:
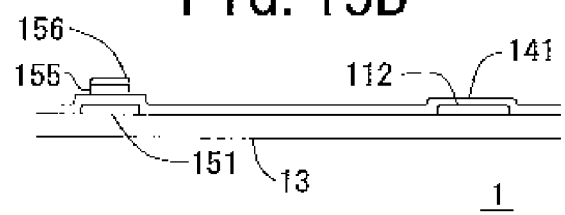
Figure 15I:

Then, the first insulating film 132 (i.e., a gate insulating film) is formed on the transparent substrate 13 having passed through the above described steps as shown in FIGS. 15B and 15H. For the first insulating film 132, SiNx (silicon nitride) about 300 nm in thickness is preferably used. The first insulating film 132 is formed by depositing the material by plasma CVD. When the first insulating film 132 is formed, the scanning signal lines 112, the auxiliary capacitance lines (not shown), and the gate electrodes 151 of the switching elements are covered by the first insulating film 132 in the active region 11 as shown in FIG. 15B. In the panel frame region 12, the data drawing lines 121 are covered by the first insulating film 132 as shown in FIG. 15H.

Then, semiconductor films 155 and ohmic contact films 156 are formed in layers at given positions on the first insulating film 132 (specifically, positions corresponding to the gate electrodes 151). For the semiconductor films 155, amorphous silicon about 100 nm in thickness is preferably used. For the ohmic contact films 156, n⁺ amorphous silicon about 20 nm in thickness is preferably used. The ohmic contact films 156 are provided for bringing favorable ohmic contact with source electrodes 152 and drain electrodes 153 to be formed in subsequent steps.

The semiconductor films 155 and the ohmic contact films 156 are prepared by plasma CVD and photolithography. First, materials of the films are deposited by plasma CVD. The formed semiconductor film material and the formed ohmic contact film material are then subjected to patterning so as to have given shapes preferably by photolithography. For the patterning, wet etching using a solution of $HF+HNO_3$ is preferably used.

Figure 15D:
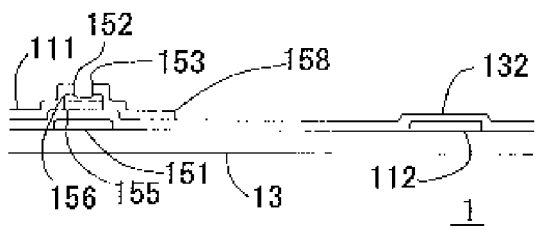
Figure 15J:
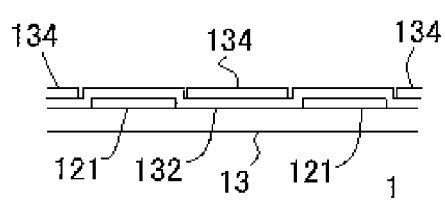

Then, data signal lines 111, drain lines 154, source electrodes 152 of the switching elements, and drain electrodes 153 of the switching elements are formed in the active region 11 as shown in FIG. 15D. The light shielding films 134 are formed in the panel frame region 12 at the same time in this step as shown in FIG. 15J.

To be specific, a second conductor film is formed on the transparent substrate 13 having passed through the above described steps. For the second conductor film, a single-layered or multilayered first conductor film preferably made of titanium, aluminum, chromium, or molybdenum can be used. Plasma CVD is preferably used in forming the second conductor film.

The formed second conductor film is subjected to patterning. Thus, the data signal lines 111, the source electrodes 152 of the switching elements, the drain electrodes 153 of the switching elements, and the drain lines 154 having given shapes and made of the second conductor film are prepared. In the panel frame region 12, light shielding films 134 made of the second conductor film are formed. In the patterning of the second conductor film, the formed semiconductor films 155 and the formed ohmic contact films 156 which overlap with the gate electrodes 151 of the switching elements are subjected to etching of a given depth.

The light shielding films 134 of the display panel substrates according to the second, fourth and sixth preferred embodiments of the present invention have different shapes but they are made of the same material by the same method.

By performing these steps, the switching elements (the gate electrodes 151, the source electrodes 152, and the drain electrodes 153), the scanning signal lines 112, the auxiliary capacitance lines (not shown), the drain lines 154, and the data signal lines 111 are formed in the active region 11 as shown in FIG. 15D. In addition, the data drawing lines 121, the first insulating layer 132, and the light shielding films 134 are formed in the panel frame region 12 as shown in FIG. 15J.

Figure 15E:
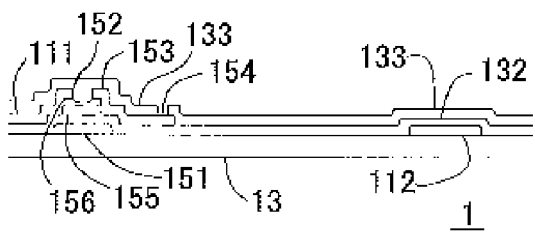
Figure 15K:
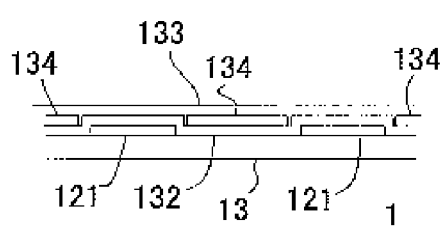

Next, a second insulating film 133 (i.e., a passivation film) is formed as shown in FIGS. 15E and 15K. A second insulating film is formed on the transparent substrate 13 having passed through the above described steps, and the formed second insulating film is subjected to patterning. Thus, the second insulating film 133 of a given shape is obtained. For the second insulating film 133, silicon nitride (SiNx) about 400 nm in thickness may be used. Plasma CVD can be used in forming the second insulating film 133. For the patterning, dry etching with $SF_6+O_2$ is preferably used.

In the patterning in this step, the first insulating film 132 which has been formed in the prior step is simultaneously subjected to patterning so as to have a given pattern. By the patterning in this step, pixel contact portions arranged to electrically connect the drain lines 154 and the pixel electrodes (see FIG. 15F) are formed in the active region 11 as shown in FIG. 15E. Although not shown, in the contact portion of the panel frame region 12, opening portions are formed in the first insulating film 132 covering the data drawing lines 121 and in the second insulating film 133 covering the data signal lines 111. Thus, the end portions of the data drawing lines 121 and the end portions of the data signal lines 111 are exposed.

Figure 15F:
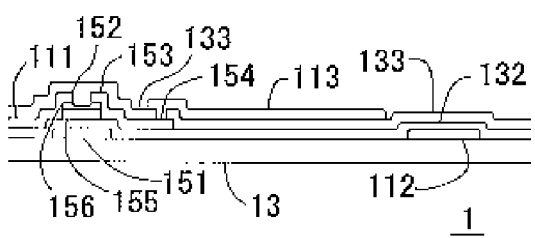

Next, pixel electrodes 113 are formed in the active region 11 as shown in FIG. 15F. Simultaneously with this step, a conductor layer 126 for providing parasitic capacitances to the data drawing lines 121 is formed in the panel frame region 12. In addition, although not shown, a conductor layer arranged to electrically connect the exposed ends of the data drawing lines 121 and the exposed ends of the data signal lines 111 are formed in the contact portion of the panel frame region 12. Thus, given one of the data drawing lines 121 and given one of the data signal lines 111 are electrically connected.

The pixel electrodes 113 in the active region 11, the conductor layer 126 for providing parasitic capacitances to the data drawing lines 121 in the panel frame region 12, and the conductor layer arranged to electrically connect the ends of the data drawing lines 121 and the ends of the data signal lines 111 are made of an identical conductor. For example, ITO (Indium Tin Oxide) about 150 nm in thickness is preferably used.

To be specific, a third conductor film as a material of the pixel electrodes 113, the conductor layer 126 for providing parasitic capacitances to the data drawing lines 121, and the conductor layer arranged to electrically connect the ends of the data drawing lines 121 and the ends of the data signal lines 111 is formed on the transparent substrate 13 having passed through the above described steps. For forming the third conductor layer, plasma CVD is preferably used. The formed third conductor film is subjected to patterning so as to have patterns of the pixel electrodes 113, the conductor layer 126 for providing parasitic capacitances to the data drawing lines 121, and the conductor layer arranged to electrically connect the ends of the data drawing lines 121 and the ends of the data signal lines 111. For the patterning of the third conductor film, wet etching with a solution of $HCl+HNO_3+H_2O$ is preferably used.

By the patterning, the pixel electrodes 113 of a given shape are formed in the active region 11 as shown in FIG. 15F. The pixel electrodes 113 are electrically connected to the drain lines 154 in the pixel contact portions formed in the second insulating film 133.

Figure 15L:
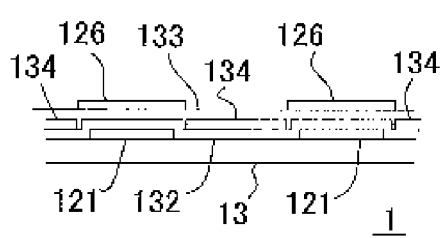

In the panel frame region 12, the conductor layer 126 overlaps with the data drawing lines 121 as shown in FIG. 15L. The conductor layers 126 according to the preferred embodiments of the present invention may have different shapes, but they are made of the same material by the same method.

By performing the above described steps, the display panel substrate 1 according to any one of the preferred embodiments of the present invention is obtained.

Owing to this configuration, capacitances are generated between the data drawing lines and the conductor layer which overlaps with the data drawing lines. In other words, the data drawing lines are given parasitic capacitances by the conductor layer which overlaps with the data drawing lines.

Next, descriptions of the configuration of the display panel having the display panel substrate according to any one of the preferred embodiments of the present invention and a method of producing the same are provided.

Figure 16:
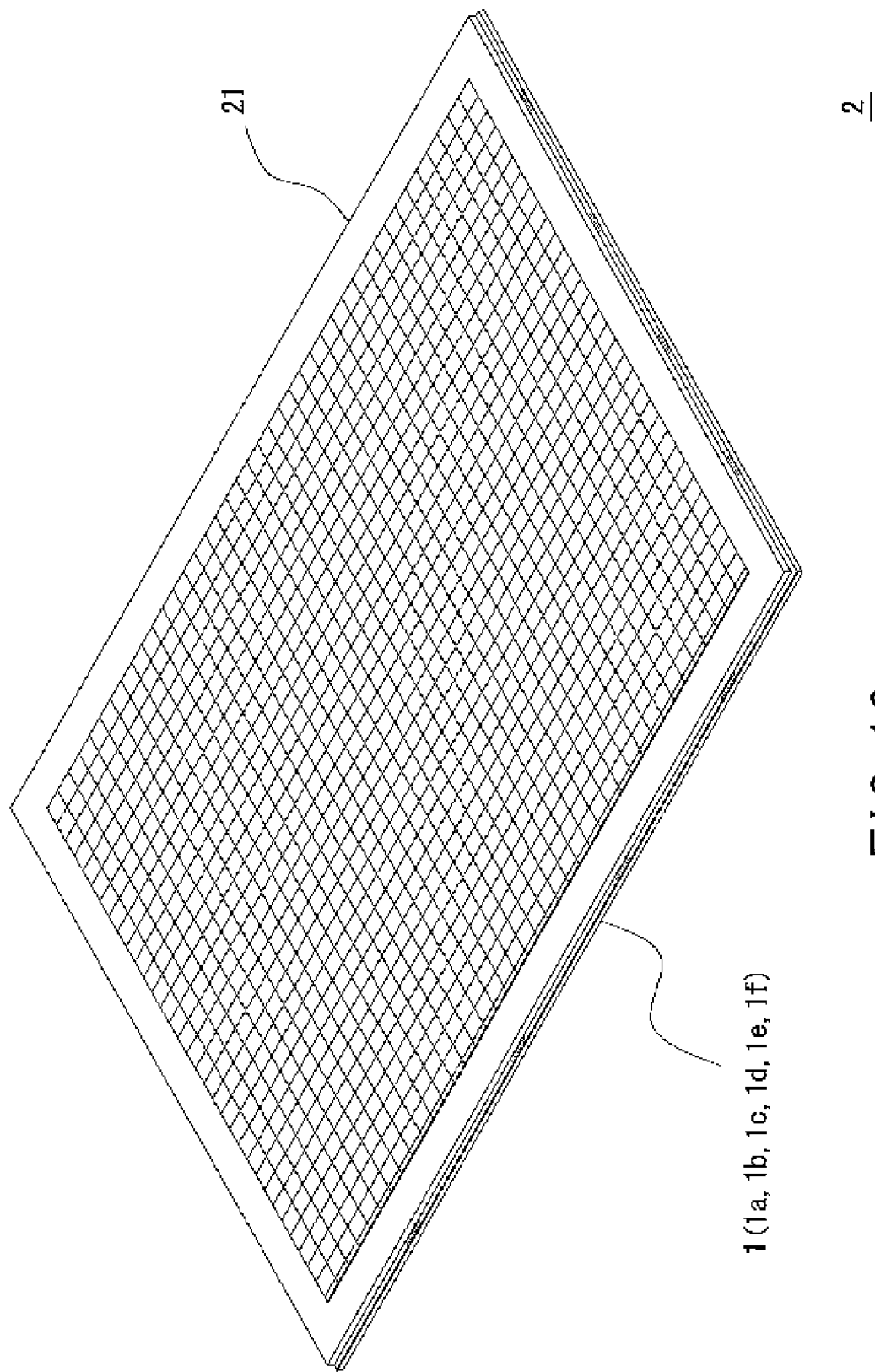
FIG. 16 is a perspective view schematically showing the configuration of the display panel having the display panel substrate according to any one of the preferred embodiments of the present invention.
Figure 18:
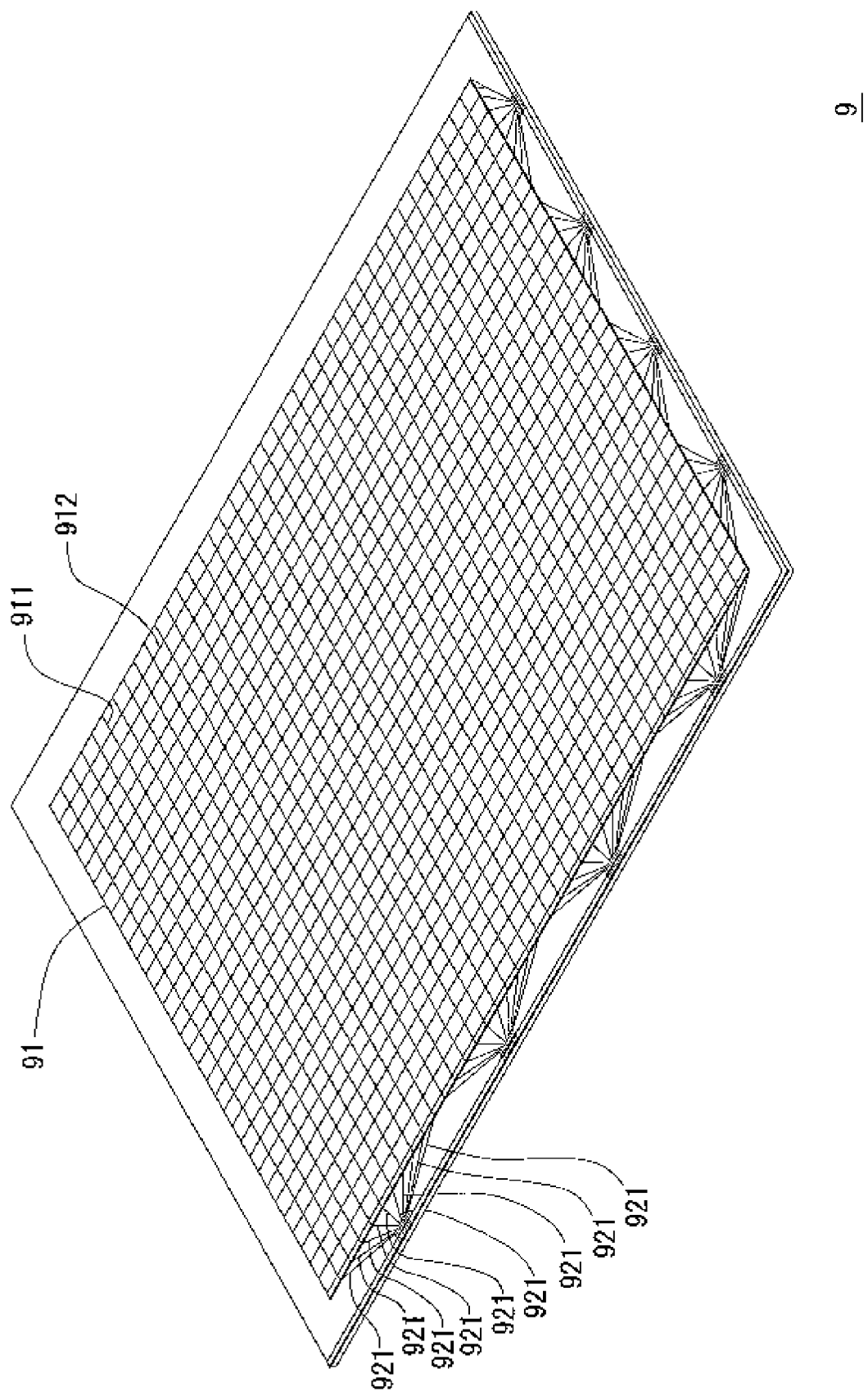
FIG. 18 is a plan view schematically showing an example of a conventional configuration of a TFT array substrate.

FIG. 16 is a perspective view schematically showing the configuration of the display panel 2 using the display panel substrate 1 according to any one of the preferred embodiments of the present invention. As shown in FIG. 16, the present display panel 2 has a TFT array substrate (i.e., the display panel substrate 1 according to any one of the preferred embodiments of the present invention) and a color filter (i.e., the common substrate 21). Liquid crystals are filled between the substrates. The configuration of the present display panel may be the same as that of a generally used liquid crystal display panel, and therefore, a description thereof is omitted.

The method of producing the present display panel includes a step of producing a TFT array substrate, a step of producing a color filter, and a step of producing a panel (cell). The step of producing a TFT array substrate is as described above.

The configuration of the color filter and the method of producing the same are as follows. FIGS. 17A to 17C are views schematically showing the configuration of the common substrate (color filter) 21. FIG. 17A is a perspective view schematically showing the overall structure of the common substrate (color filter) 21. FIG. 17B is a plan view of the configuration of one pixel in the common substrate (color filter) 21. FIG. 17C is a cross-sectional view along the line B-B showing the cross sectional structure of the pixel.

As shown in FIGS. 17A to 17C, the common substrate (color filter) 21 is configured such that a black matrix 211 is formed on a transparent substrate 217 preferably made of glass, and color layers 212 of red, green, and blue color resists are provided in squares of the black matrix 211. The squares in which the color layers 212 are provided are arranged in a given order. A protective film 213 is formed on the black matrix 211 and the color layers 212, and a transparent electrode (common electrode) 214 is formed on the protective film 213. Alignment control structural elements 125 arranged to control alignment of liquid crystals are formed on the transparent electrode (common electrode) 214.

The step of producing a color filter includes a step of forming a black matrix, a step of forming color layers, a step of forming a protective film, and a step of forming a transparent electrode (common electrode).

The step of forming a black matrix by resin BM for example is performed as follows. First, a BM photoresist (a photosensitive resin material containing a black coloring material) is applied on the transparent substrate 217. Then, the applied BM photoresist is formed into a given pattern preferably by photolithography, and a black matrix of a given pattern is obtained. In the step of forming a black matrix, a light shielding layer may be formed simultaneously from the BM photoresist. The light shielding layer defines an element to prevent transmission of unnecessary light and is provided in a panel frame region of the common substrate (color filter) 21.

In the step of forming color layers, the color layers 122 of red, green, and blue colors for color display are formed. In the case of using a color sensitive material method, a color sensitive material (a solution in which a pigment of a given color is dispersed in a photosensitive material) is applied on the transparent substrate 217 on which the black matrix 121 has been formed. Then, the applied color sensitive material is formed into a given pattern preferably by photolithography. This step is repeated for each of red, green, and blue colors. Thus, the color layers 122 of red, green, and blue colors are obtained.

The method used in the step of forming a black matrix is not limited to the resin BM method, and various known methods such as a chromium BM method and an overlap method can be preferably used. The method used in the step of forming color layers is not limited to the color resist method, and various known methods such as a printing method, a dyeing method, an electrodeposition method, a transfer method and a photo-etching method can be used. It is also preferable to use a back-face exposure method of forming color layers first and forming a black matrix subsequently.

In the step of forming a protective film, the protective film 213 is formed on the black matrix 211 and the color layers 212 preferably using a method in which a protective film material is applied on the surface of the transparent substrate 217 having passed through the above described steps with the use of a spin coater (an overcoating method), and a method of forming the protective film 213 of a given pattern preferably by printing and photolithography (patterning). The protective film material is preferably an acrylate resin or an epoxy resin.

In the step of forming a transparent electrode (common electrode), the transparent electrode (common electrode) 214 is formed on the protective film 213. In the case of forming the transparent electrode (common electrode) 214 by masking, a mask is placed on the transparent substrate 217 having passed through the above described steps and ITO or other material is evaporated onto the mask preferably by sputtering, and the transparent electrode (common electrode) are formed.

Then, the alignment control structural elements 215 are formed preferably by photolithography. A photosensitive material is applied on the transparent substrate 217 having passed through the above described steps and is exposed through a photomask so as to have a given pattern. Then, unnecessary portions are removed therefrom in a subsequent step of development, and the alignment control structural elements 215 of a given pattern are formed.

By performing the above described steps, the common substrate (color filter) 21 is obtained.

Next, the step of producing a panel (cell) is described. An alignment layer is formed on the TFT array substrate having passed through the above described steps (i.e., the display panel substrate 1 according to any one of the preferred embodiments of the present invention) and an alignment layer is formed on the common substrate (color filter) 21. The formed alignment layers are subjected to alignment processing. Then, the display panel substrate 1 according to any one of the preferred embodiments of the present invention and the common substrate (color filter) 21 are bonded together and a space therebetween is filled with liquid crystals.

The alignment layers are formed on the display panel substrate 1 according to any one of the preferred embodiments of the present invention and the common substrate (color filter) 21 in the following manner. First, an alignment material is applied on the display panel substrate 1 according to any one of the preferred embodiments of the present invention and the common substrate (color filter) 21 preferably using an alignment material coating device. An alignment material refers to a solution which contains a substance from which an alignment layer is made. As the alignment material coating device, a commonly-used device such as a cylinder-type press machine and an ink-jet press machine is used. Then, the applied alignment material is heated and baked preferably using a baking system.

Next, the baked alignment layers are subjected to alignment processing. For the alignment processing, various known processing methods such as a method in which tiny scratches are made on an alignment layer using a rubbing roll and optical alignment processing in which surface properties of an alignment layer are adjusted by irradiating the alignment layer with light energy such as ultraviolet light are used.

Next, a sealing material is applied on either the display panel substrate 1 according to any one of the preferred embodiments of the present invention or the common substrate (color filter) 21 preferably by using a seal patterning device. In a position in which the sealing material is applied, the linear conductor for providing parasitic capacitances to the data drawing lines is exposed.

A spacer for maintaining a cell gap uniform at a given thickness is sprayed on either the display panel substrate 1 according to any one of the preferred embodiments of the present invention or the common substrate (color filter) 21 preferably using a spacer sprayer. Liquid crystal are drop filled in a region surrounded by the sealing material on the display panel substrate 1 according to any one of the preferred embodiments of the present invention or the common substrate (color filter) 21 preferably using a liquid crystal drop fill device.

Then, the display panel substrate 1 according to any one of the preferred embodiments of the present invention and the common substrate (color filter) 21 are bonded together in a reduced-pressure atmosphere. At this time, the sealing material applied to the display panel substrate 1 according to any one of the preferred embodiments of the present invention is in contact with the common electrode 214 of the common substrate (color filter) 21.

Conductive fine particles (e.g., gold beads) are mixed in the sealing member as described above. Thus, when the display panel substrate 1 according to any one of the preferred embodiments of the present invention and the common substrate (color filter) 21 are bonded together, electrical conduction is provided between the conductor layers 126 provided to the display panel substrate 1 according to any one of the preferred embodiments of the present invention and the common electrode 214 of the common substrate (color filter) 21. Thus, the conductor layer 126 for providing parasitic capacitances to the data drawing lines 121 and the common electrode 214 have equal or substantially equal potentials.

Liquid crystals may be filled between the display panel substrate 1 according to any one of the preferred embodiments of the present invention and the common substrate (color filter) 21 after curing the sealing material.

By performing the above described steps, the present display panel is obtained. A lighting inspection is performed on the obtained display panel. If a streaky display defect is detected by the lighting inspection and the display defect is judged to be caused by a short between the data drawing line and the conductor layer, a correction is made as described above.

The foregoing descriptions of the preferred embodiments and the implementation example of the present invention have been presented for purposes of illustration and description with reference to the drawings. However, the present invention is not limited to the preferred embodiments, and modifications and variations are possible as long as they do not deviate from the principles of the present invention.

As described above, the number of data drawing lines in one line bundle is not limited and is appropriately determined according to the resolution of the display panel and the number of line bundles provided outside of the active region.

The configurations and the production methods of the display panel substrate according to the preferred embodiment of the present invention and the color filter are only given as examples in the above descriptions, and the present invention is not limited thereto.

What is claimed is:

1. A display panel substrate comprising:
    data signal lines;
    drawing lines electrically connected to the data signal lines;
    an insulating film;
    a plurality of strip conductors which overlap with the drawing lines with the insulating film sandwiched therebetween; and
    connecting portions arranged to electrically connect the strip conductors to one another.

2. The display panel substrate according to claim 1, wherein the connecting portions comprise portions which do not overlap with the drawing lines.

3. The display panel substrate according to claim 1, wherein
    the drawing lines comprise zigzag portions,
    the strip conductors overlap with the zigzag portions of the drawing lines with the insulating film sandwiched therebetween, and
    the connecting portions comprise portions intersecting with the drawing lines in the zigzag portions.

4. The display panel substrate according to claim 1, wherein
the plurality of strip conductors which overlap with each of the drawing lines with the insulating film sandwiched therebetween are electrically connected linearly by the connecting portions, and
laterally adjacent ones of the plurality of strip conductors which overlap with one of the drawing lines with the insulating film sandwiched therebetween and the plurality of strip conductors which overlap with another one of the drawing lines adjacent to said one of the drawing lines are electrically connected to one another by the connecting portions.

5. The display panel substrate according to claim 1, wherein
the plurality of strip conductors which overlap with one of the drawing lines with the insulating film sandwiched therebetween are electrically connected linearly by the connecting portions, and
the connecting portions arranged to connect the strip conductors which overlap with one of the drawing lines and the connecting portions arranged to connect the strip conductors which overlap with another one of the drawing lines adjacent to said one of the drawing lines are further electrically connected.

6. The display panel substrate according to claim 1, wherein the plurality of strip conductors which overlap with the drawing lines with the insulating film sandwiched therebetween are electrically connected linearly by the connecting portions.

7. The display panel substrate according to claim 1, wherein the strip conductors and the connecting portions arranged to electrically connect the strip conductors are made of a same material as pixel electrodes.

8. The display panel substrate according to claim 1, further comprising light shielding films which are made of a light shielding material and provided between the drawing lines,
wherein the connecting portions comprise portions which do not overlap with any of the drawing lines and the light shielding films.

9. A display panel comprising:
the display panel substrate according to claim 1; and
a common substrate opposed to the display panel substrate.

10. The display panel according to claim 9, wherein the strip conductors of the display panel substrate are electrically connected to a common potential line of the common substrate by a conductive sealing material.

* * * * *